United States Patent [19]
Failla

[11] Patent Number: 5,128,662
[45] Date of Patent: Jul. 7, 1992

[54] COLLAPSIBLY SEGMENTED DISPLAY SCREENS FOR COMPUTERS OR THE LIKE

[76] Inventor: Stephen J. Failla, 39 Dogwood Dr., Chester, N.J. 07930

[21] Appl. No.: 424,547

[22] Filed: Oct. 20, 1989

[51] Int. Cl.⁵ ............................................. G09G 3/20
[52] U.S. Cl. ............................... 340/752; 340/717; 340/711; 340/700; 248/924
[58] Field of Search ........... 340/716, 711, 717, 700, 340/752, 784, 793, 754, 815.12, 815.23; 350/334, 335; 248/917, 924

[56] References Cited

U.S. PATENT DOCUMENTS

| | | | |
|---|---|---|---|
| D. 250,588 | 12/1978 | Mayer et al. | D14/106 |
| D. 274,728 | 7/1984 | Shibata | D14/113 |
| D. 284,193 | 6/1986 | Marshall | D14/101 |
| D. 288,566 | 3/1987 | Chin et al. | D14/106 |
| D. 290,256 | 9/1987 | Sapper | D14/106 |
| D. 294,831 | 3/1988 | Hara et al. | D14/106 |
| 3,623,085 | 11/1971 | Hodson | 340/815.12 |
| 3,940,748 | 2/1976 | Carson | 340/173 |
| 4,007,443 | 2/1977 | Bromberg et al. | 340/172.5 |
| 4,110,792 | 8/1978 | Long et al. | 358/240 |
| 4,408,836 | 10/1983 | Kikuno | 350/334 |
| 4,517,660 | 5/1985 | Fushimoto et al. | 364/708 |
| 4,589,659 | 5/1986 | Yokoi et al. | 273/1 |
| 4,629,289 | 12/1986 | Streit | 350/336 |
| 4,667,299 | 5/1987 | Dunn | 364/708 |
| 4,703,160 | 10/1987 | Narishima et al. | 235/1 |
| 4,730,364 | 3/1988 | Tat-Kee | 16/337 |
| 4,772,100 | 9/1988 | Suenaga | 350/336 |
| 4,782,336 | 11/1988 | Bailey | 340/754 |
| 4,791,417 | 12/1988 | Bobak | 340/793 |
| 4,806,922 | 2/1989 | McLaughlin et al. | 340/784 |
| 4,948,232 | 8/1990 | Lange | 350/334 |

*Primary Examiner*—Alvin E. Oberley
*Assistant Examiner*—Darin Miller
*Attorney, Agent, or Firm*—Bell, Seltzer, Park & Gibson

[57] ABSTRACT

A collapsible, storable information display screen for use with an electronic information processing device is disclosed which alleviates many of the problems associated with the smaller display screens. The display screen, when in use, is assembled in an electrically interconnected, mechanically stable, predetermined array, and when not in use, may be disassembled from said array and collapsed for compact storage.

12 Claims, 20 Drawing Sheets

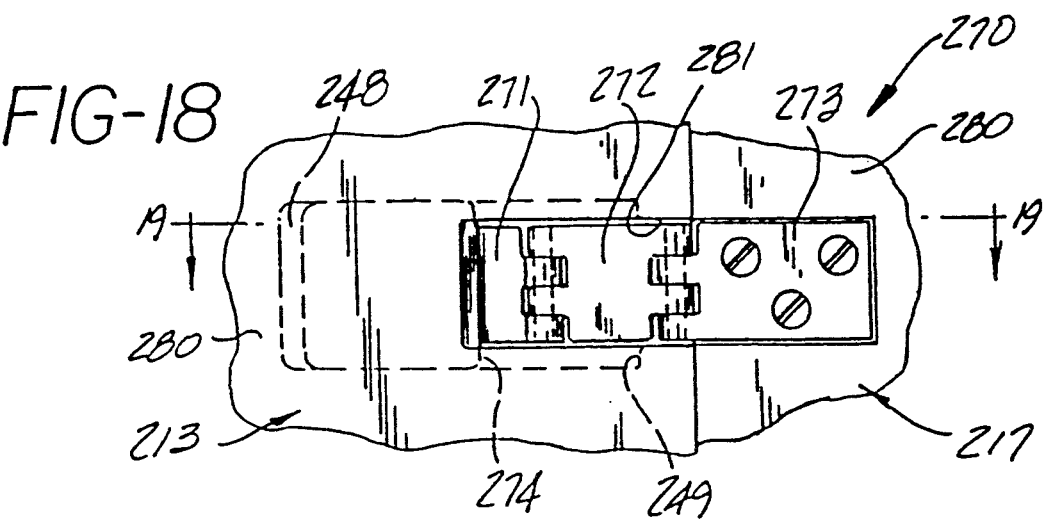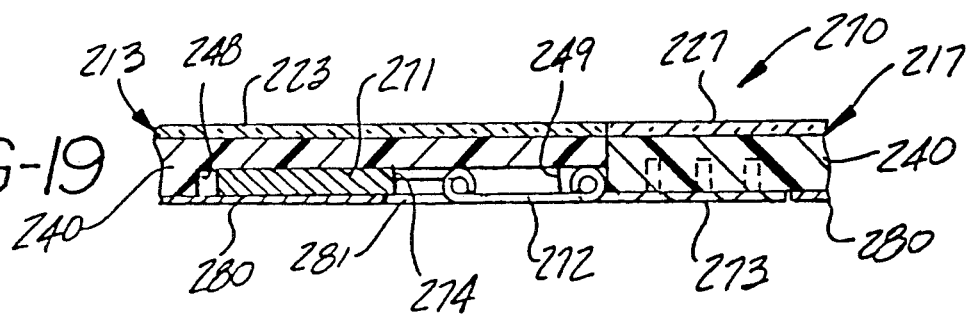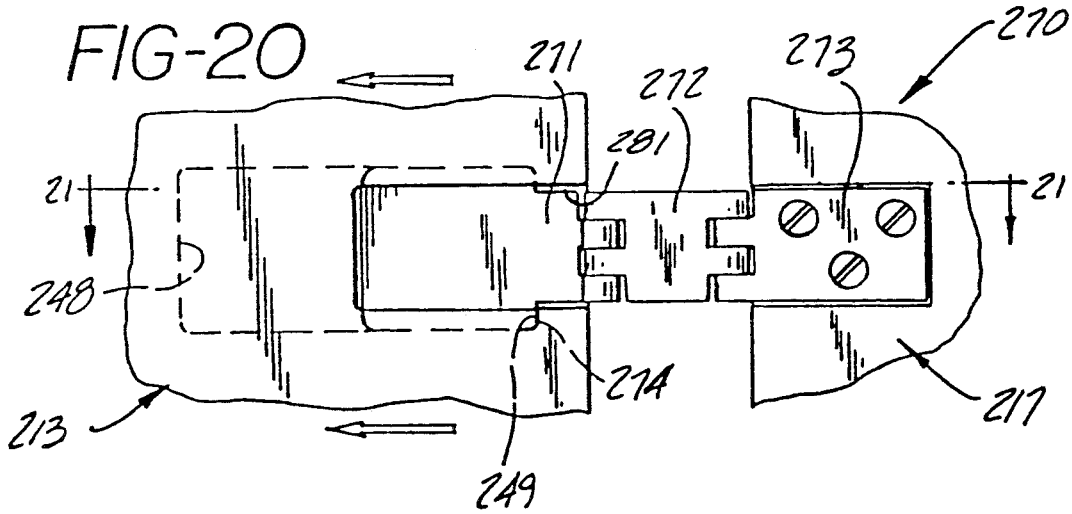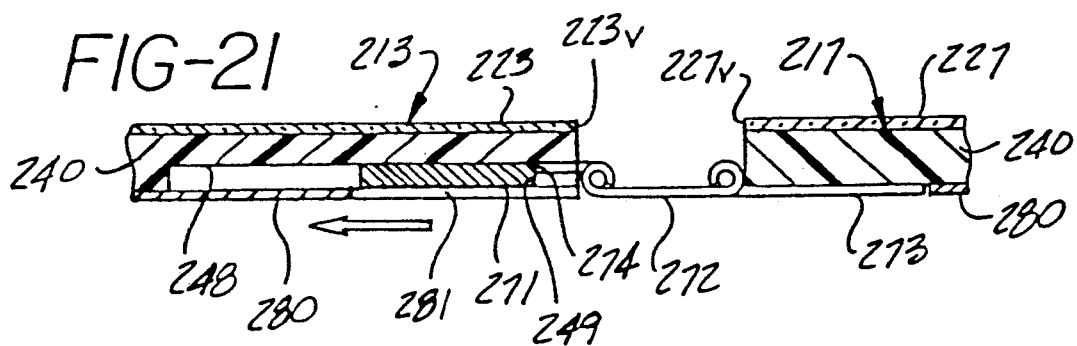

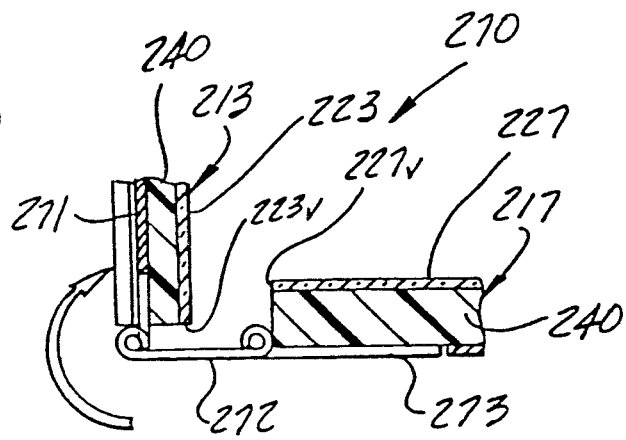
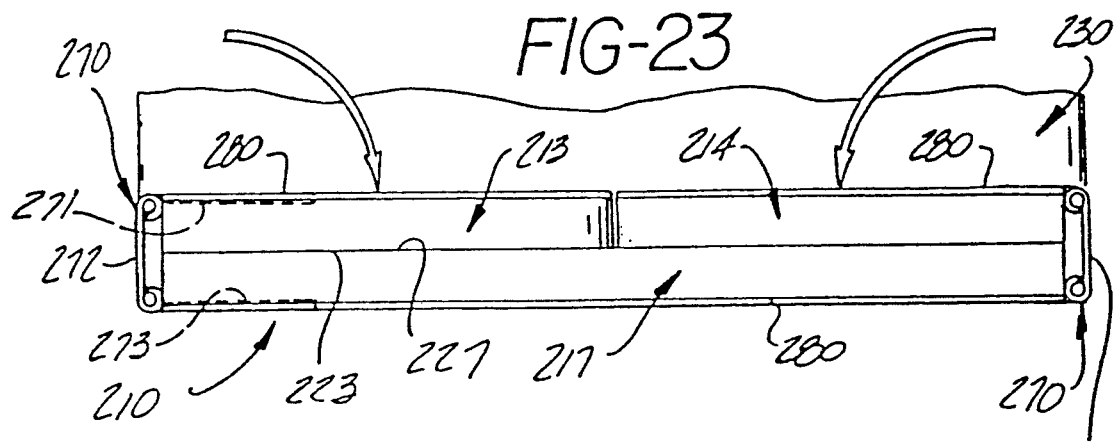
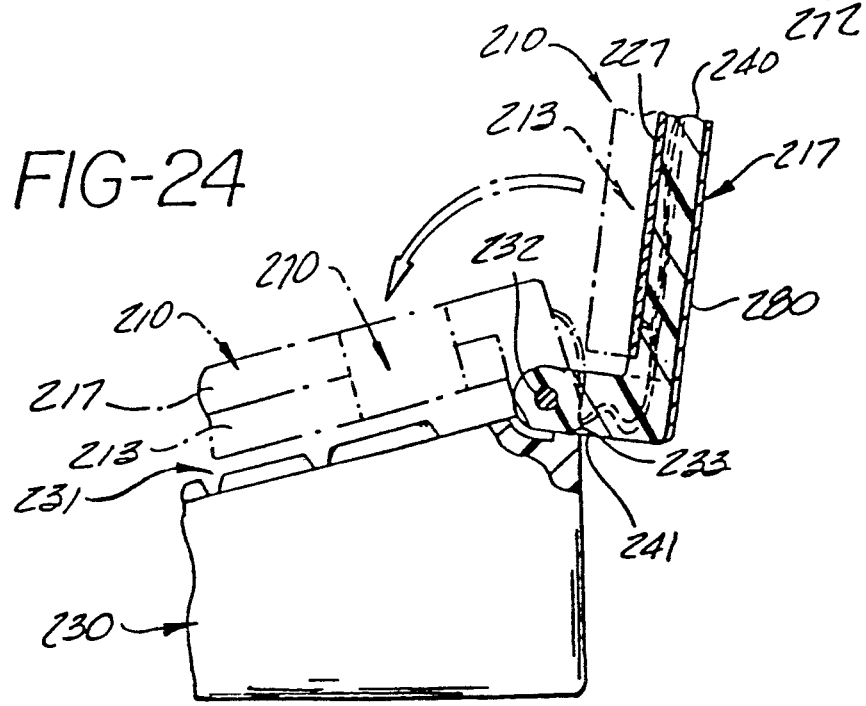

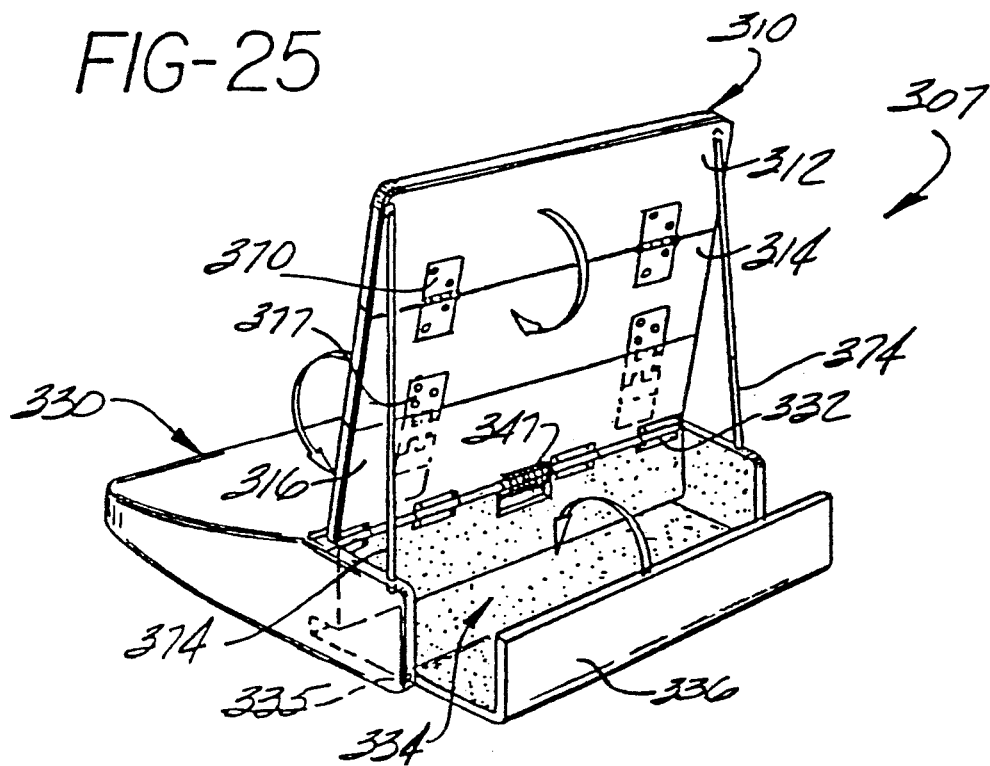
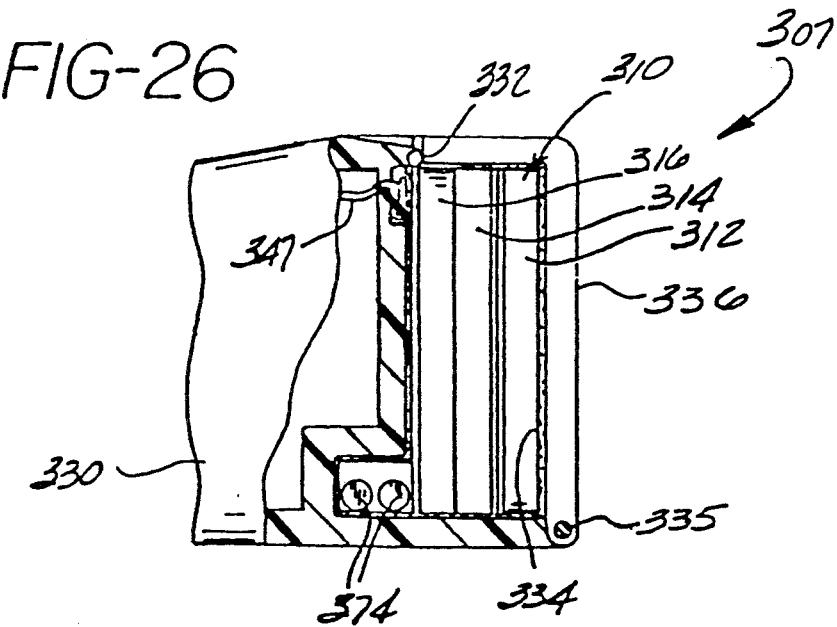

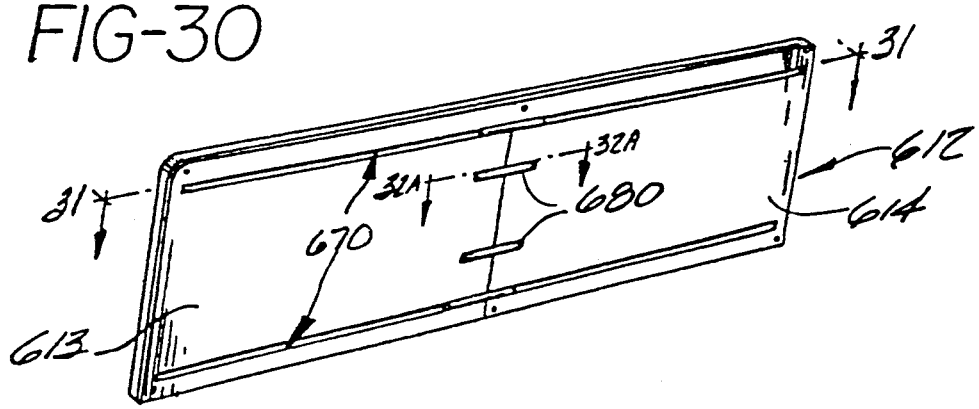
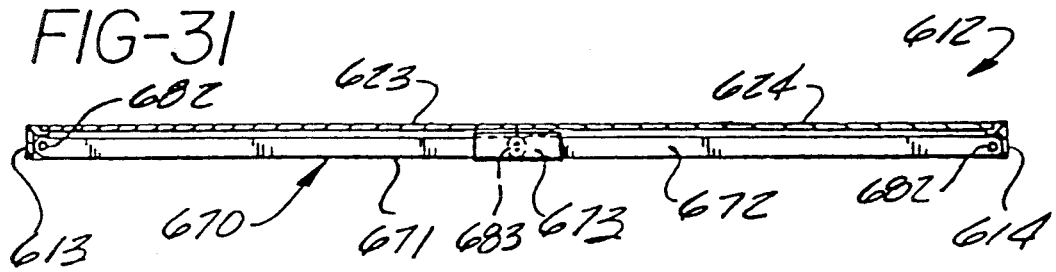
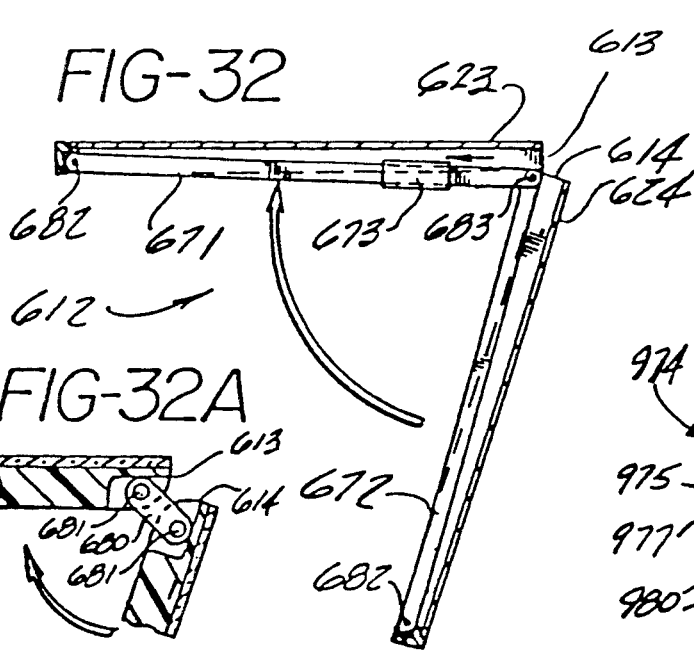
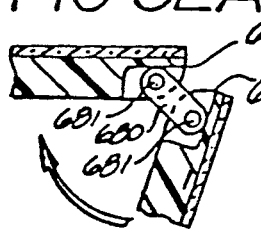
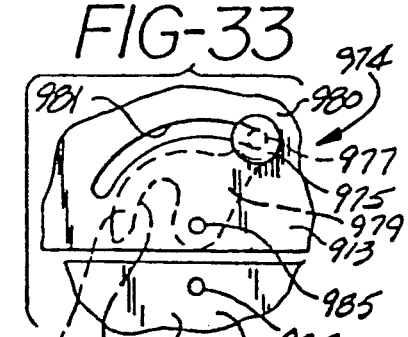
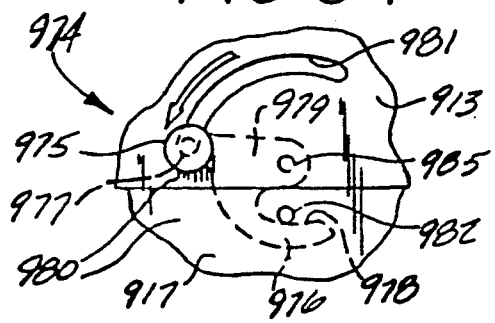

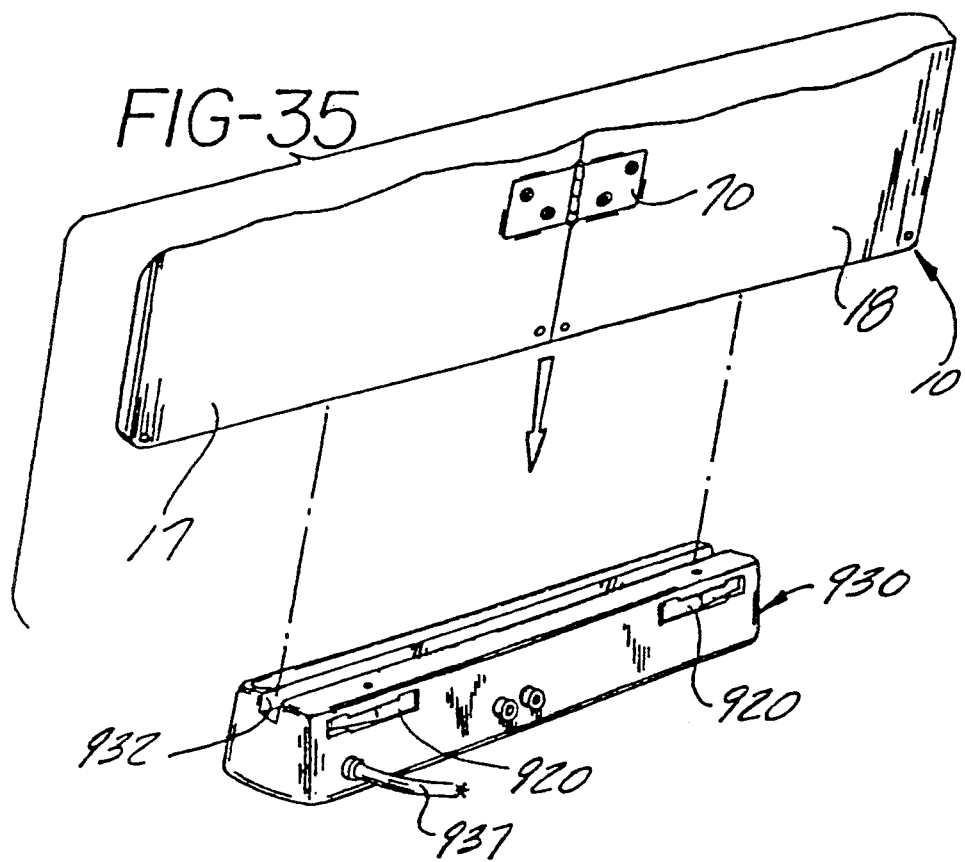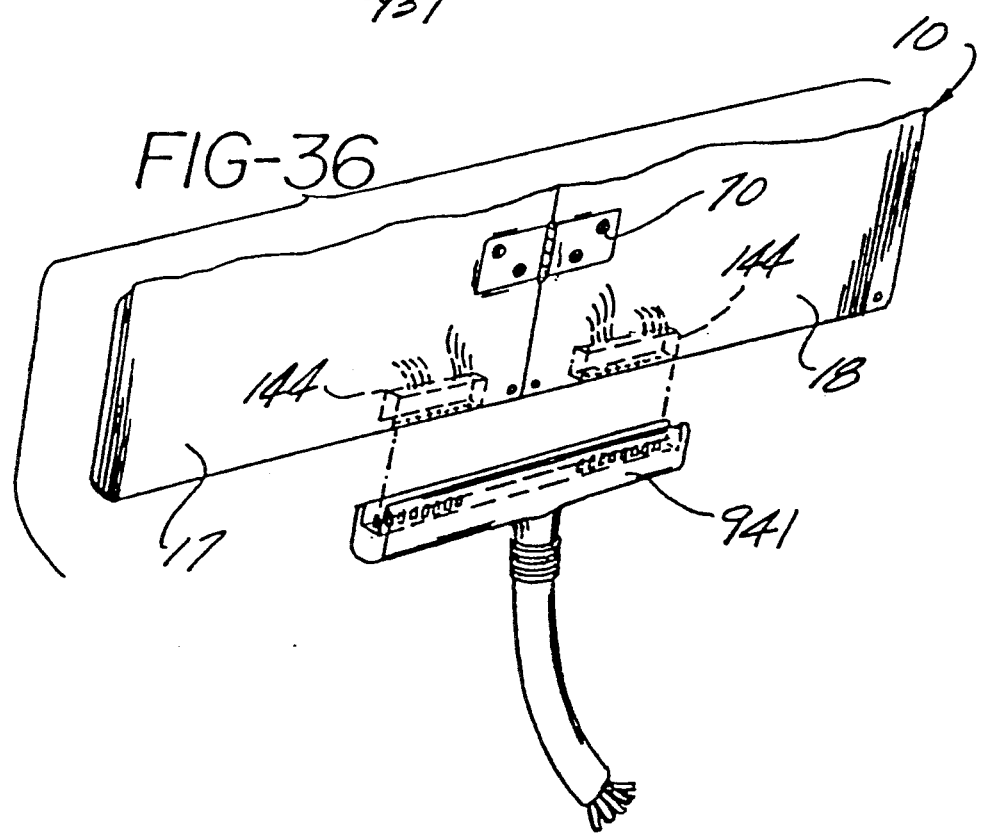

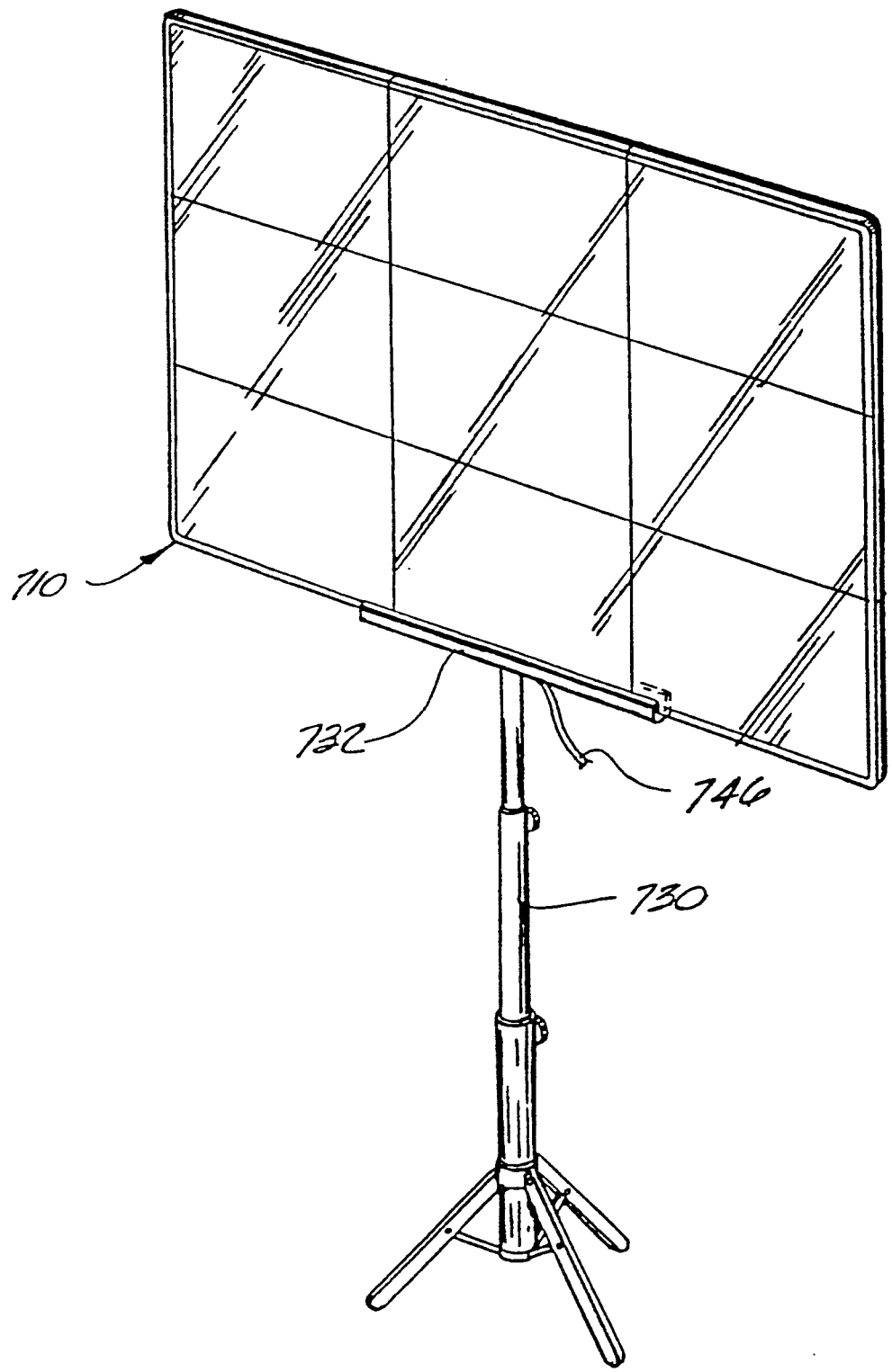

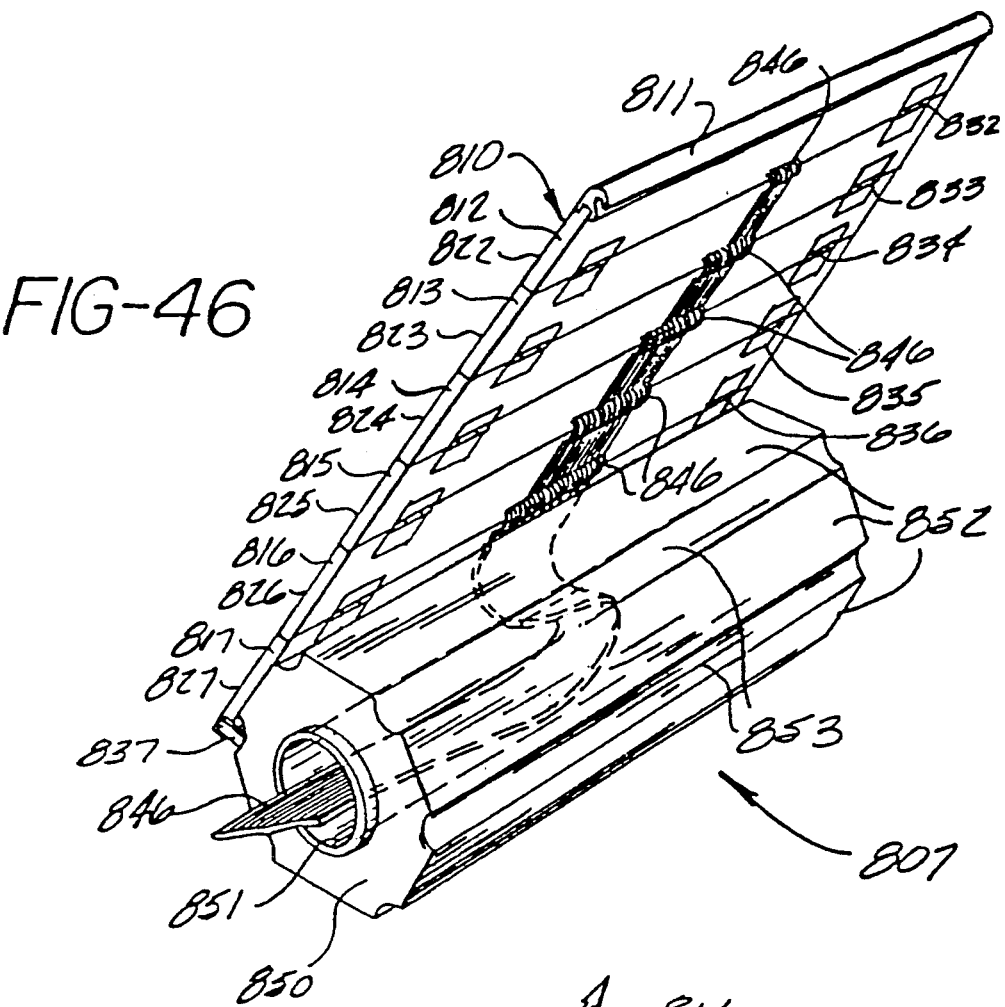
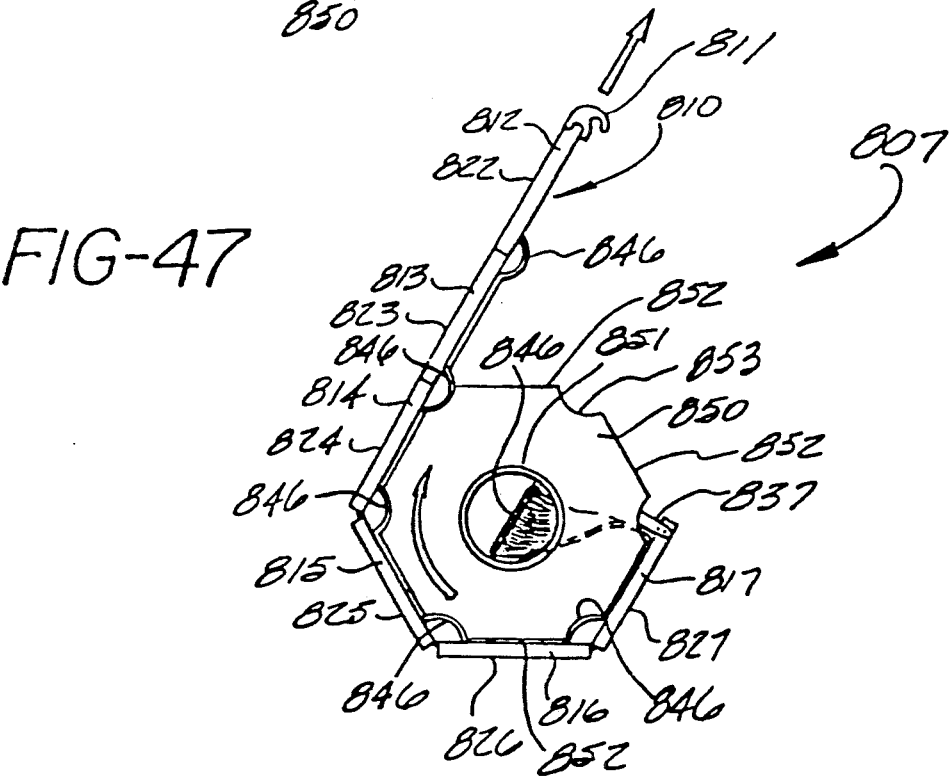

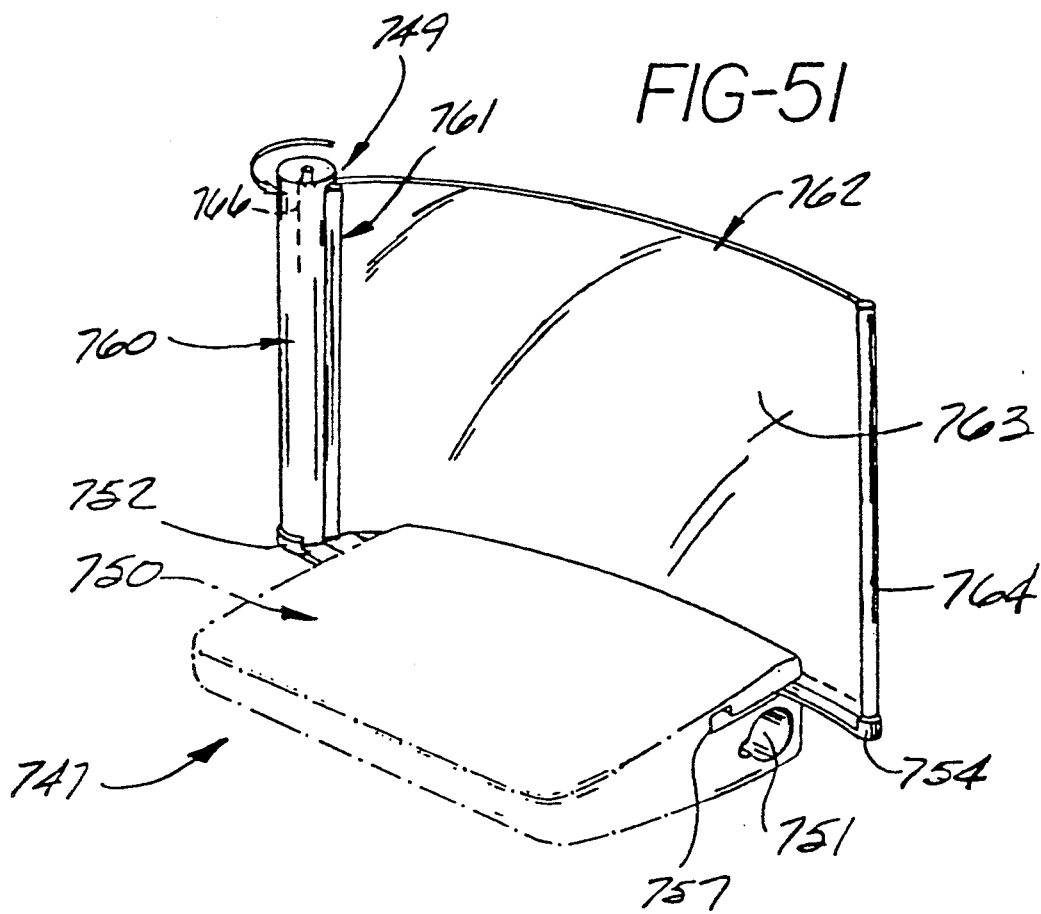
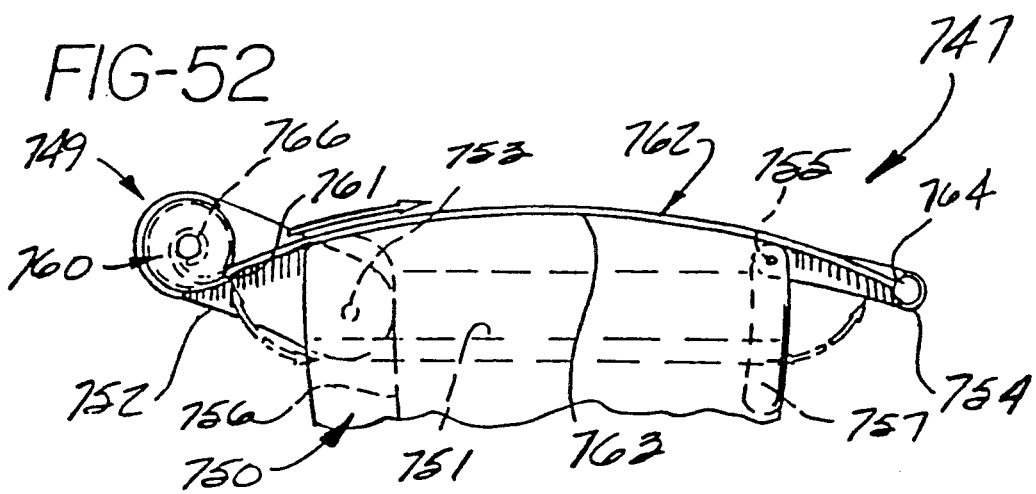

COLLAPSIBLY SEGMENTED DISPLAY SCREENS FOR COMPUTERS OR THE LIKE

FIELD OF THE INVENTION

This invention relates to visual information display screens for use in conjunction with electronic information processing devices, and more particularly to portable computers, portable calculators, portable industrial process controllers, or the like. Specifically, it relates to display screens which are formed of a number of segments which may be when in use so arranged as to provide a substantial area for visual information display, yet which may be when not in use rearranged in compact relation for storage and travel. In this way, for example, a display screen can be provided which has a usable display area considerably greater than that which the length and width of the portable device itself would ordinarily provide, yet which when said segments are collapsed into compact relation can be stored for traveling within a volume consistent with the dimensions of such device. Likewise, for further example, such a segmented screen can be provided which is not when in use larger than the dimensions of such device, yet when collapsed will fit for storage and travel within but a small portion of the volume provided by the dimensions of such device.

BACKGROUND OF THE INVENTION

The range of portable electronic information processing devices of most interest herein encompasses those broad families of computers, calculators, and data processor-based controllers which are readily transportable by individuals and usable on location. Such devices are usually self contained, and are commonly and descriptively known by numerous names, such as, for example, notebook computers, lap-top computers, hand-held computers, pocket computers, portable microcomputers, portable industrial controllers, pocket calculators, credit card calculators, credit card computers, wrist watch calculators or wrist watch computers. These devices are for simplicity sometimes collectively referred to herein merely as "portable computers", rather than the more cumbersome "portable electronic information processing devices". The reader, however, will readily understand and appreciate that when the term "portable computer" is used, the entire range of portable electronic information processing devices is intended.

The problem particularly addressed herein arises from the small size of these portable computers or the like, which necessarily must be such that an individual may both comfortably transport the computer and comfortably operate the computer in temporary or remote locations, including on his or her lap or in his or her hand while, for example, traveling in an airplane or in a car. By the same token, since they are handily transportable, such portable computers ordinarily are when not in use either disposed for protection within a carrying case, or folded down upon themselves to form a protective carrying case. Thus, of the necessity borne of portability, the visual information display screens utilized in conjunction with such portable computers or the like are in dimension quite small, which size constitutes a substantial limitation and is in multiple respects disadvantageous.

One such disadvantage is, of course, one of visibility itself, for below a certain character size, the individual using the computer must strain to see the information displayed on the screen. Concomitantly, the amount of such information displayed at any one time must necessarily be limited, and is frequently less than that available on the CRT display of a desktop computer, for example. Yet another related disadvantage of present portable computers is that many software programs designed to run on personal, desktop, or home computers often cannot function on portable computers because their menus and screen displays are not compatible with the smaller capacity portable computer displays. These limitations are more fully described in the January, 1984 issue of *Creative Computing*, published by AHI Computing, a division of the Ziff Davis Publishing Co. Likewise, U.S. Pat. No. 4,007,443 attempts a limited solution to the same general problem, describing therein an L-shaped hand-held computer which provides a larger display screen by making the width of the screen project beyond the width of the keyboard.

This set of difficulties will likely become more severe in the future, when it will probably be deemed desirable to further reduce the traveling size of portable computers. However, the size of the display screen cannot practically become smaller. Thus, that screen size is destined to become a primary factor in limiting appreciable further reduction in the size of portable computers. In contrast, portable computers having large display screens using large, easily readable characters would be significantly advantageous for many uses, including word processing, spread sheet operations, graphics operations and program writing. That is, while the computer shrinks, a way must be found to at least keep the display screen the same, previous size, or preferably, increase its usable information display area.

SUMMARY OF THE INVENTION

With the foregoing in mind, it is, thus, an object of this invention to provide a visual information display screen for use with a portable computer or the like which is of a size which is possessed of both enhanced information visibility and an enhanced amount of information display capability when compared with those currently available, while still being readily storable for transportability.

Similarly, it is also an object of this invention to provide a visual information display screen for use with a portable computer or the like which has at least the same information visibility and amount of information display capability as those currently available while being readily collapsible into a storage and transport volume smaller than those currently available.

Likewise, it is yet another object of this invention to provide an improved information display screen for use with a portable computer or the like, which screen is collapsibly segmented.

These and other objects of the invention are met by providing a plurality of information display segments, each segment having a back, a front and at least three sides and each segment being adapted to be abuttably disposed adjacent at least one other segment in side-to-side relation; electronically actuatable visual information display means carried by each said segment and so disposed as to usably visible from the front thereof; first electrical connection means associated with each said segment for conductively connecting said segment to at least one other segment; second electrical connection means associated with at least one said segment for conductively connecting said segment to said electronic information processing device; first mechanical connection means associated with each said segment for supportably connecting said segment to at least one other segment; whereby said plurality of information display segments may when in use be assembled in an electrically interconnected, mechanically stable, predetermined array, and when not in use may be disassembled from said array and collapsed for compact storage.

Such display screen can further comprise second mechanical connection means associated with at least one of said segments for supportably connecting said segment to said electronic information processing device whereby said screen, when assembled in said predetermined array, may be stably disposed with respect to said device.

Both the first electrical and first mechanical connection means can be carried by either the back of a segment or by at least one side thereof. Such first mechanical connection means can, for example, either be articulably constructed or be disengageable. Likewise, such first electrical connection means can be disengageable, but need not be, or can also be articulably constructed. The sides of said segments can be either rectilinear or curvilinear. Thus, the screen segments can, for example, have four rectilinear sides rectangularly arranged, or can, for further example, have three sides, and be either triangular or pie-slice-shaped.

It is contemplated that in the most usual embodiment, the electronically actuatable visual information display means carried by each segment will be planar in form, and that when said plurality of segments is assembled in array for use, all said means will lie in the same plane. However, it will be understood as being within the scope of this invention that some or all of said display means may be curved toward or away from the user—that is, may be either cylindrically or spherically concave or convex. Likewise, even when said display means are each individually planar, it is within the scope of this invention that, when assembled in array for use, at least some of said display means may be so disposed as to, for example, angularly extend toward the user. That is, said plurality may be so disposed as to simulate, for example, a cylindrically concave screen.

BRIEF DESCRIPTION OF THE DRAWINGS

These embodiments of the present invention will now be more fully described in conjunction with the accompanying drawings, wherein:

FIG. 3A is a perspective view of the segmented display screen when collapsed and the segments are arranged in compact relation for storage.

FIG. 18 is a rear elevational view of the forwardly articulating compound hinge depicted in FIG. 17, carried by the back of two adjacent segments.

FIG. 19 is a cross-sectional view taken along line 19—19 of FIG. 18.

FIG. 20 is a view similar to FIG. 18 showing the compound hinge in an intermediate position.

FIG. 21 is a cross-sectional view taken along line 21—21 of FIG. 20.

FIG. 22 is a view similar to FIG. 21 showing the compound hinge in a further intermediate position.

FIG. 23 is a top plan view of the collapsibly segmented display screen of FIG. 17 showing the compound hinges and the display screen segments in their collapsed position.

FIG. 24 is a partial cross-sectional view taken along line 24—24 of FIG. 17, showing the segments in compact relation for storage. The phantom lines show the position of the segments when they are pivoted down onto the information processing device.

FIG. 25 is a perspective view of another embodiment of the present invention showing a portable computer utilizing a segmented display screen nondisengageably mounted on an information processing device.

FIG. 26 is a side elevational view of the computer shown in FIG. 25 partially in cross section, showing the segments in compact relation for storage and stored within a storage compartment built into the information processing device.

FIG. 30 is a perspective view of a pair of display screen segments which are nondisengageably collapsible upon each other, being connected with multiple bar linkages.

FIG. 31 is a cross-sectional view taken along line 31—31 of FIG. 30.

FIG. 32 is a view similar to FIG. 31 showing the segments in an intermediate position.

FIG. 32A is a cross-sectional view taken along line 32A—32A of FIG. 30, with the segments shown in the intermediate position of FIG. 32.

FIG. 33 is an elevational view of a cam lock assembly in its open position, mounted within a display screen segment.

FIG. 34 is a view similar to FIG. 33 showing the cam lock in its. locked position, abuttably adjoining and locking adjacent segments to each other.

FIG. 35 is an exploded perspective view of a segmented display screen of the present invention, and a base stand. the screen deriving its support and electrical input signals from the base stand, which is in turn connected to an information processing device.

FIG. 36 is an exploded view of a segmented display screen and a pin terminal bar, which supplies the electrical input signals.

FIG. 37 is a perspective view showing a collapsible segmented display screen of the present invention but larger in size for audience viewing, and mounted on a floor stand.

FIG. 46 is a perspective view of a segmented display screen wherein the segments are so nondisengageably interconnected as to be storable in a scroll configuration on an appropriately configured roller.

FIG. 47 is a side view of the screen shown in FIG. 46.

FIG. 51 is a perspective view of another embodiment utilizing a flexible display screen similar to that of FIG. 48.

FIG. 52 is a top plan view of the screen shown in FIG. 51.

DETAILED DESCRIPTION OF THE INVENTION

Figure 1:
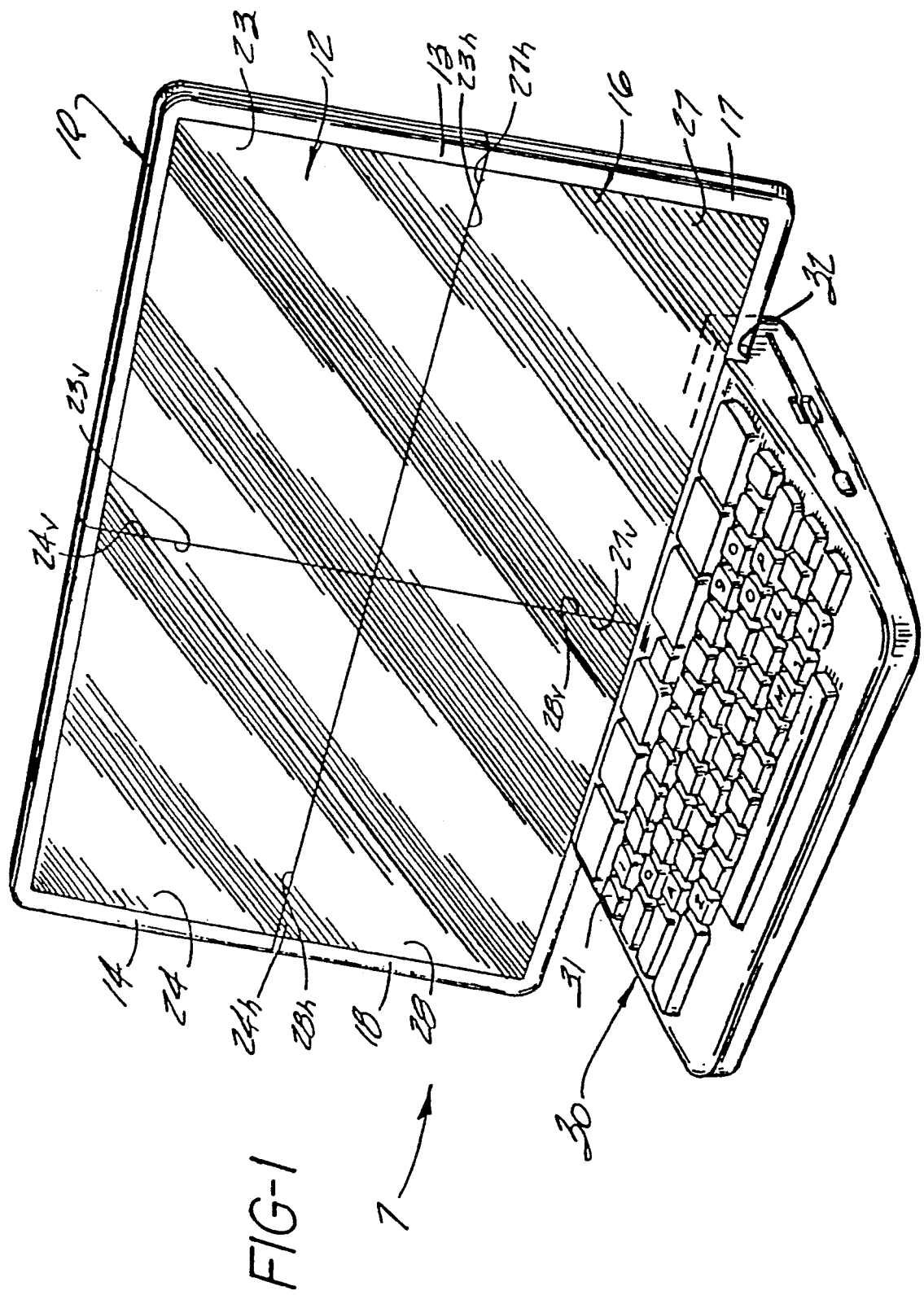
FIG. 1 is a perspective view from the front of a portable computer utilizing one embodiment of the collapsibly segmented visual information display screen of the present invention, shown with the plurality of segments arranged in the predetermined array.
Figure 2:
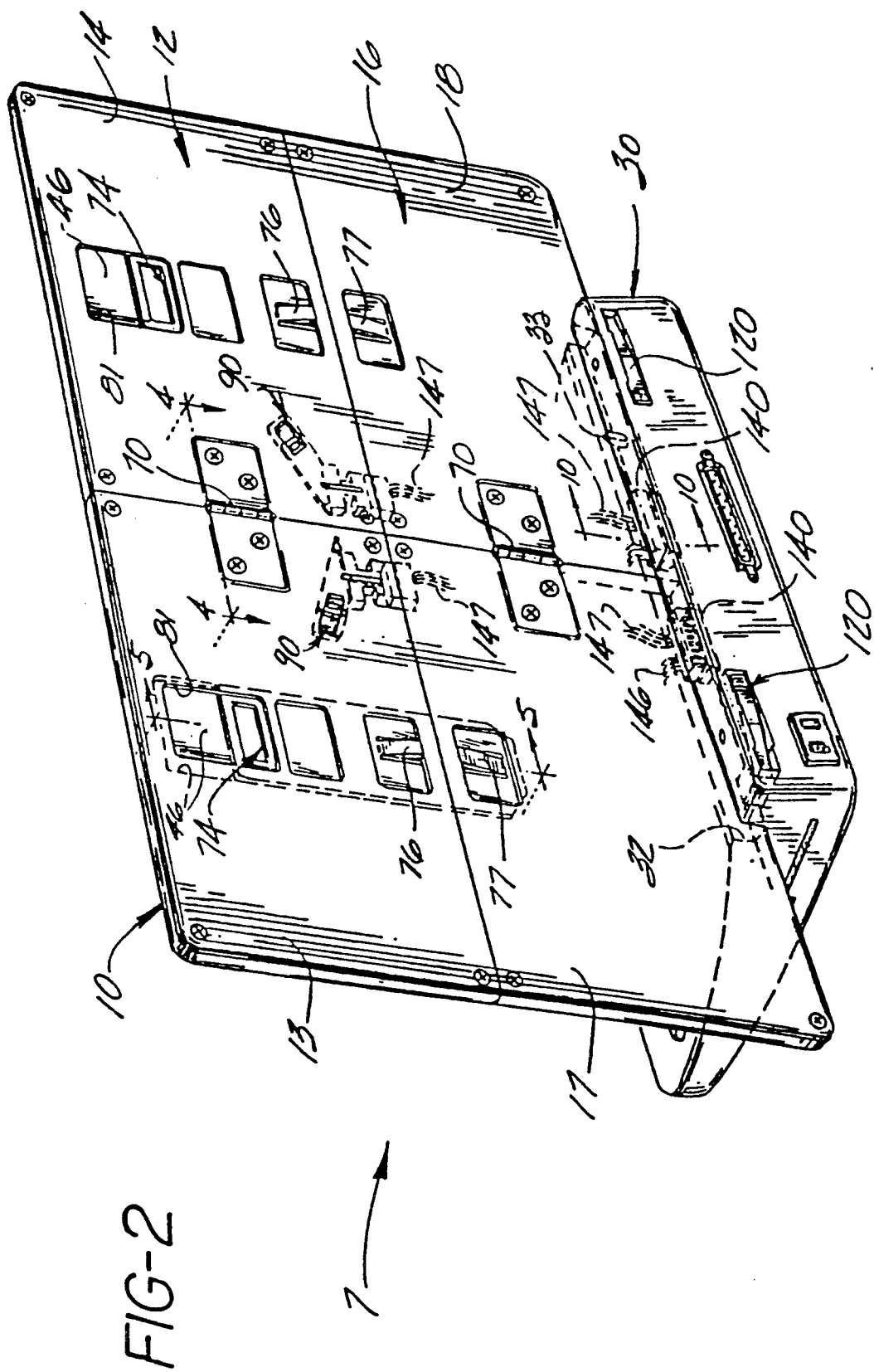
FIG. 2 is a perspective view from the back of the same computer and screen shown in FIG. 1, showing the mechanical and electrical connections between various display screen segments and between the segmented display screen and the portable electronic information processing device itself.

FIGS. 1 through 15 depict various aspects of the same combination of a portable computer and visual information display screen. Referring specifically to FIGS. 1 and 2, the combination of a portable computer 30 and display screen 10 utilizes one embodiment of the collapsibly segmented visual information display screen of the present invention. Segmented display screen 10 comprises a plurality of segments 13, 14, 17 and 18, abuttably disposed in a predetermined array for use, which screen is collapsible and which segments are rearrangeable in compact relation for storage. Portable computer 30 typically may include a keyboard 31, or other manual input means, a data processing unit not shown, memory means not shown, and power source, also not shown. The front of each display screen segment has disposed thereon an electronically actuatable visual information display means, such display means being shown as items 23, 24, 27 and 28.

FIG. 2 shows, from the rear, the same combination of a portable computer 30 and a collapsible segmented display screen 10 as is shown in FIG. 1, and also shows generally the means which provide the necessary mechanical and electrical connections which permit the display screen segments to be abuttably arranged in side-by-side relation in a predetermined array for use, while permitting the segments to be disarranged from said array and rearranged into compact relation for storage. Additionally shown are the means for providing mechanical and electrical connections between the display screen and the portable computer. These connection means will now be described in detail.

Figure 3:
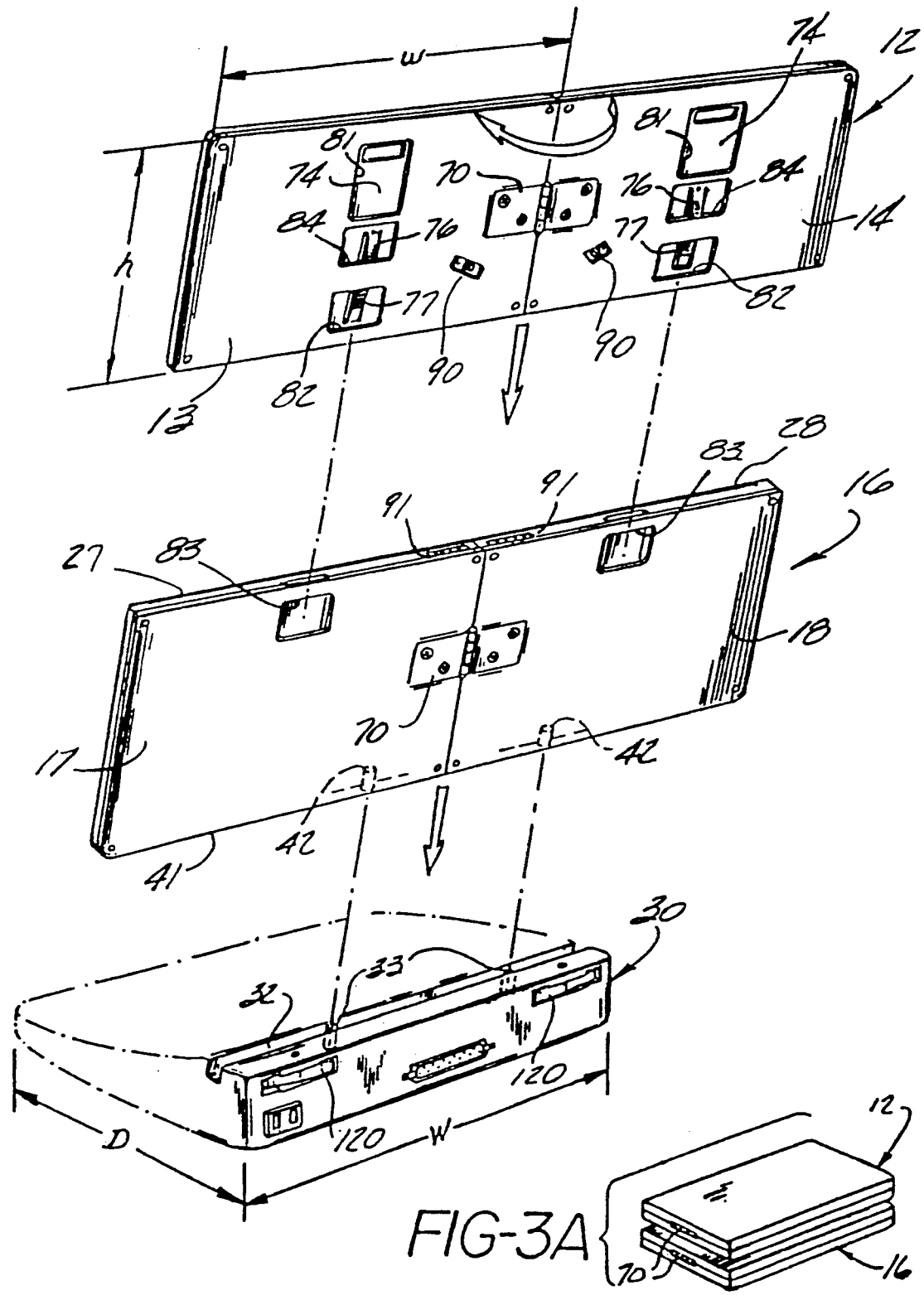
FIG. 3 is an exploded perspective view of the same computer and screen shown in FIG. 2.
Figure 4:
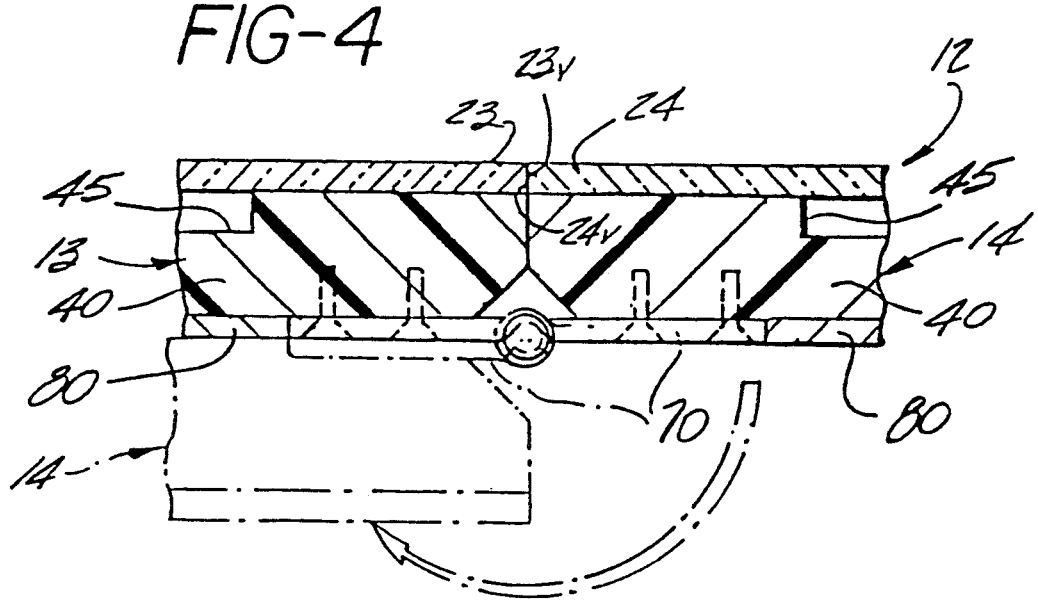
FIG. 4 is a cross-sectional view taken along line 4—4 of FIG. 2, showing a rearwardly articulating hinge mounted on the back of two abuttably adjacent segments.

In FIGS. 3 and 4 segments 13 and 14 are nondisengageably attached to each other by rearwardly articulating hinge 70, forming upper segment assembly 12. In FIG. 4, segment 14 is shown articulated in phantom so that it is stacked back to back with segment 13. Similarly, non-disengageable segments 17 and 18 form lower segment assembly 16. FIG. 3A further shows assemblies 12 and 16 each folded and stacked in compact relation for storage. Note also in FIG. 4 that electronically actuatable electronic display means 23 and 24 abuttably adjoin each other along sides 23v and 24v when in the predetermined array for use. This close proximity is desirable to prevent or minimize any discontinuities in the viewing pattern at the adjoining sides of the segments. Also shown in FIG. 4 is the construction of typical segments showing a display means 24 in front, a metal back plate 80 in back, and a core 40 sandwiched between them, and combining therewith to form a plastic segment side. In the same manner, display screens 27 and 28 abuttably join each other along sides 27v and 28v when in the predetermined array for use.

Figure 5:
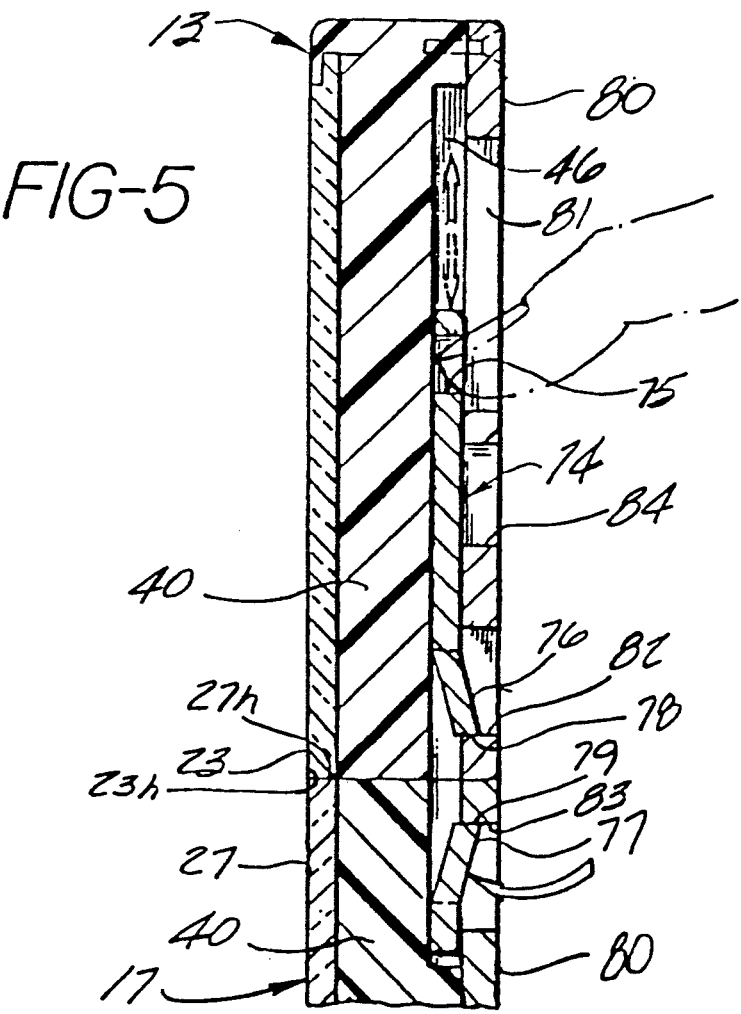
FIG. 5 is a cross-sectional view taken along line 5—5 of FIG. 2, showing a slide latch which engages and locks adjacent segments in predetermined array relation.
Figure 6:
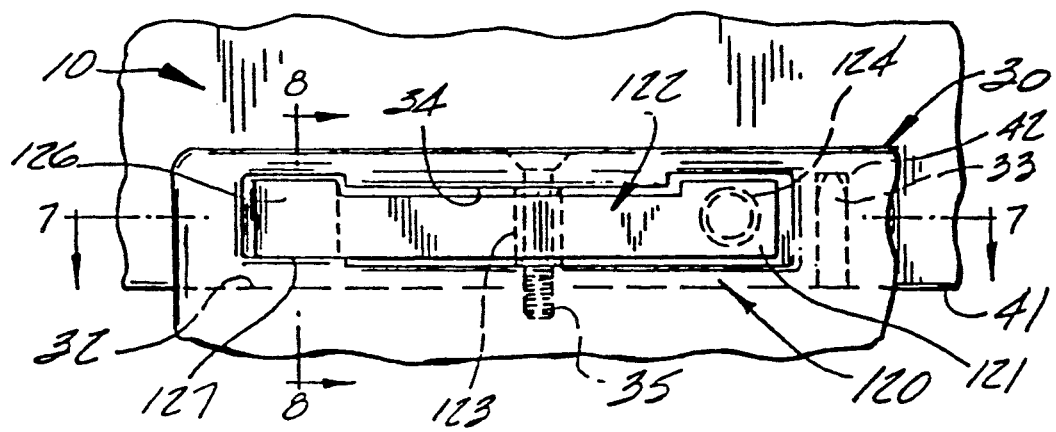
FIG. 6 is a rear elevational view of the pivoting latch assembly depicted in FIG. 2 by which means the segmented display screen is locked into engagement with the information processing device.
Figure 7:
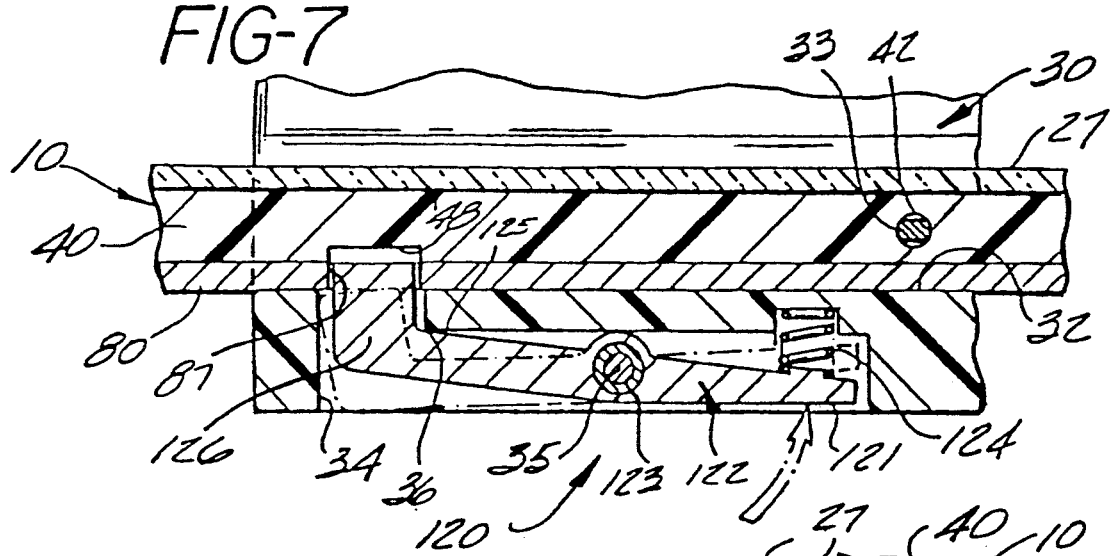
FIG. 7 is a cross-sectional view taken along line 7—7 of FIG. 6.
Figure 8:
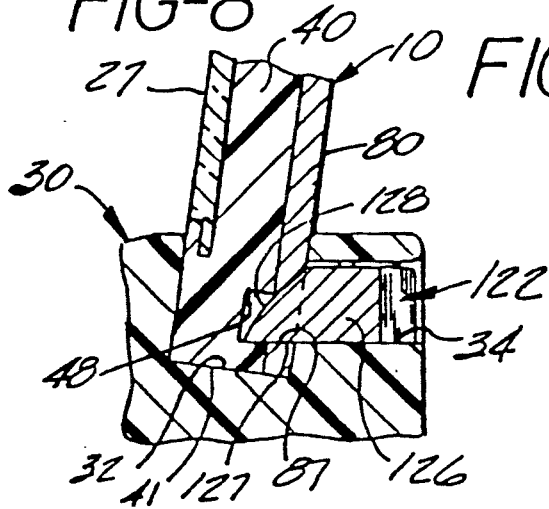
FIG. 8 is a cross-sectional view taken along line 8—8 of FIG. 6.
Figure 9:
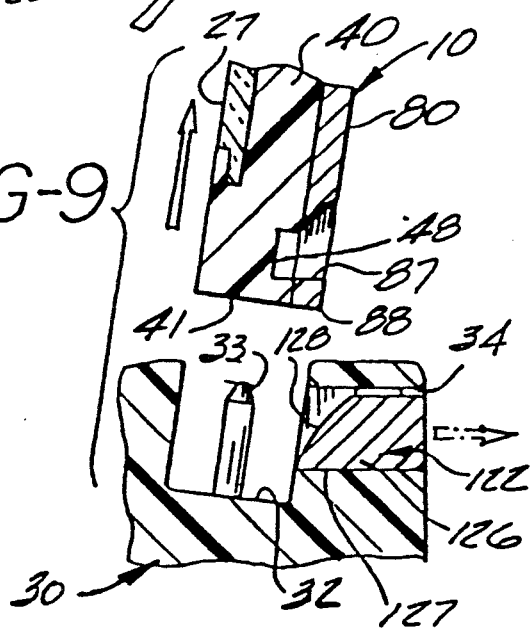
FIG. 9 is a view similar to FIG. 8 showing the segmented display screen displaced during removal from the information processing device.

Referring now to FIGS. 2 and 5, slide latches 74 located in the upper segment assembly serve to provide a locating and latching function with the lower segment assembly. The slide latches ride in grooves 46 molded into the cores 40. The back plates 80 retain the slide latches within the grooves. The tips 79 of latching fingers 77 latch against edges 83 of access openings in the back plates 80 of the lower segment assembly. The tips 78 of latching fingers 76 in like manner latch against edges 82 of access holes in the back plates of the upper segment assembly. This arrangement serves to abuttably adjoin sides 23h and 27h of electronically actuatable visual display means 23 and 27 respectively, when the segments are in their predetermined array for use. The phantom finger shown in FIG. 5 has just completed pressing against edge 75 of the slide latch to move it into its latched position as shown. Access openings 81 in the back plate allow finger access to the slide latch. In a similar manner, when segments 14 and 18 are positioned in their predetermined array for use, sides 24h and 28h abuttably adjoin each other.

Referring now to FIGS. 3 and 5, in order to mechanically disengage upper segment assembly 12 and lower segment assembly 16, latching fingers 77 are manually pressed thus disengaging their tips 79 from edges 83. This frees the slide latches permitting them to slide upwardly, thus retracting them from the lower segment assembly. As the slide latches are moved upward, latching fingers 76 will be cammed into alignment with the plane of the slide latches by edges 85 of the back plates. As the slide latches continue to slide upward, latching fingers 76 will again spring outward thus latching tips 78 of the latching fingers against edges 84. This retains the slide latches within the upper segment assembly 12 as shown in FIG. 3. In similar manner, in order to again extend the slide latches, latching fingers 76 would be manually depressed thus disengaging tips 78 from edges 84 of the back plates.

The retractable electrical connection means 90 shown in FIG. 2 which electrically connects upper segment assembly 12 with lower segment assembly 16 will now be described in detail, referring to FIGS. 13, 14, and 15. The core 40 of lower segment 18 contains a female terminal 91 with sockets 92, connected to wires 147. The core 40 of upper segment 14 contains a retractable male terminal 93, having pins 94. Flexible electrical conductors, preferably wire ribbons, run from the pins to the display means 24. The pins are retractable to within the periphery of upper segment 14 in order to avoid potential damage when the screen is collapsed and the segments are disarranged or disassembled from the predetermined array for use. This is accomplished by having the retractable male connector assembly vertically slidable. Its guide bar 95 is slidably constrained within slot 86 of back plate 80. Groove 47, which is molded into core 40, along with the back plate, contains and constrains sliding wedge 100.

Figure 13:
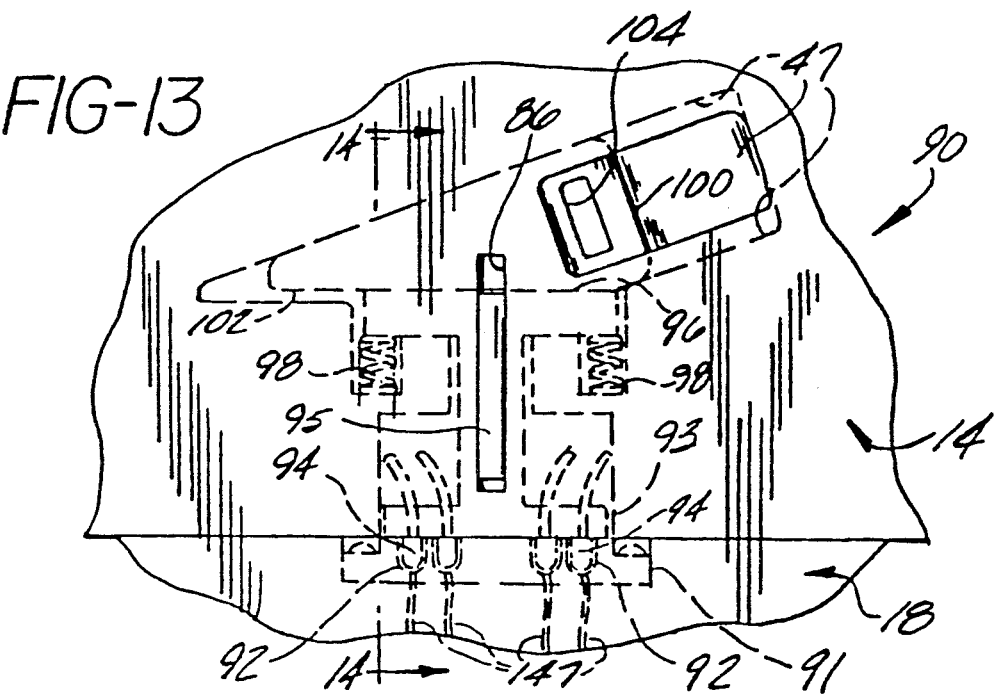
FIG. 13 is a rear elevational view of the retractable electrical connection means between adjacent segments depicted in FIG. 2.
Figure 14:
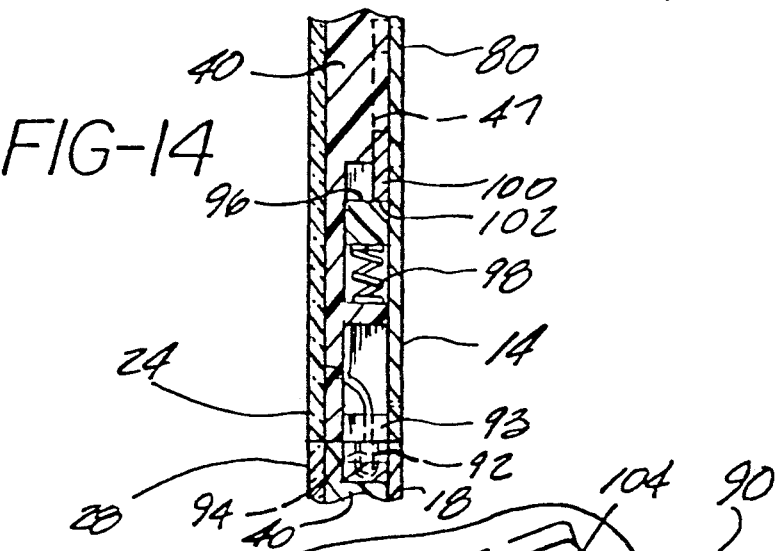
FIG. 14 is a cross-sectional view taken along line 14-14 of FIG. 13.
Figure 15:
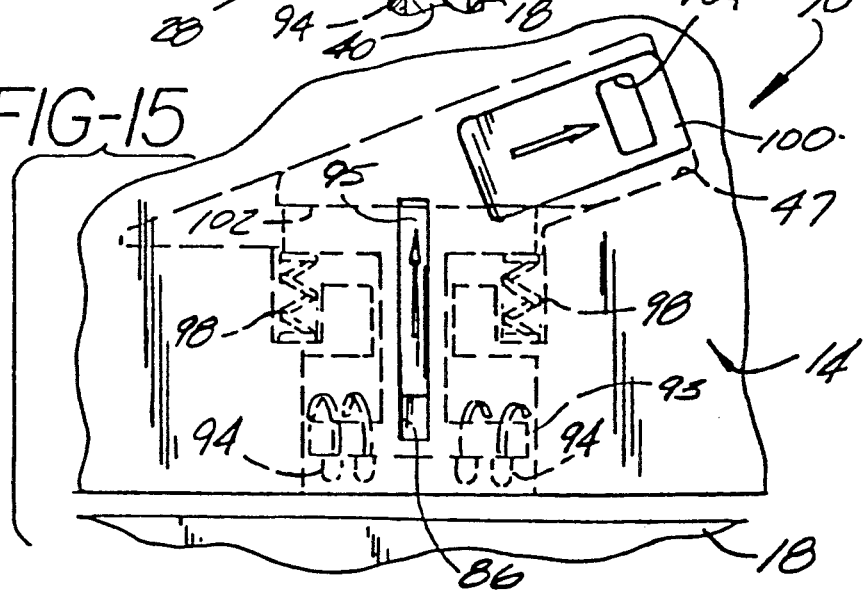
FIG. 15 is a view similar to FIG. 13, showing the retractable electrical connection means in its retracted position.

Referring to FIG. 13, when the segments are being disarranged from their use array, the user places a finger in finger slot 104 of the sliding wedge and manually slides it in a generally rightward direction as shown by the arrow in FIG. 15. This raises camming surface 102 of the sliding wedge. Springs 98, which bias the retractable male terminal toward a upward position, then serve to automatically retract the terminal with the pins 94. In order to again extend the pins when assembling the segments into the predetermined array for use, the sliding wedge is manually moved leftward thus lowering and sliding its camming surface 102 against the top surface 96 of the retractable male terminal, thus moving it downward against the force of the springs 98. All of the mechanical and electrical connecting means between the various segments of this display screen embodiment, being the first mechanical connection means and first electrical connection means, have now been described.

Now considering second mechanical means for removably attaching the segmented display screen 10 to the portable computer 30, refer to FIGS. 3, 6, 7, 8, and 9. Lower segment assembly 16 is supportedly constrained within slot 32 of control module 30, its bottom surface 41 resting against the bottom of the slot. The pivoting latch assembly 120, which is contained within recess 34 of the control module, locks the lower segment assembly into place within the slot 32. Pawl 126 of pivoting latch 122 has locking surface 127 which restrains mating surface 87 of backplate 80. To remove the collapsibly segmented display screen 10, or more precisely, the lower segment assembly 16, manually push end 121 of the pivoting latch against the resistance of spring 124 as shown by the phantom arrow. The pivoting latch will then pivot about pin 35 mounted within the portable computer, with bushing 123 serving to reduce friction. This pivoting motion will cause the pawl to retract from depression 48 in the core 40 and the backplate 80 of the lower segment assembly, and will permit the segmented display screen to be removed from the slot. When the end 121 of pivoting latch 122 is released, the spring 124 will cause the pivoting latch to pivot, thus causing the pawl 126 to reenter the slot 32. The surface 125 of the pivoting latch will stop against corner 36 of the control module. When reconnecting the collapsibly segmented display screen to the portable computer, the screen is lowered into slot 32 and corner 88 of backplate 80 strikes against camming surface 128 of the pawl, causing the pivoting latch to retract. When the segmented display screen is fully seated within the slot, the spring 124 will cause the pawl to reengage depression 48, thus locking mating surface 87 of the depression against locking surface 127 of the pivoting latch 122.

Figure 10:
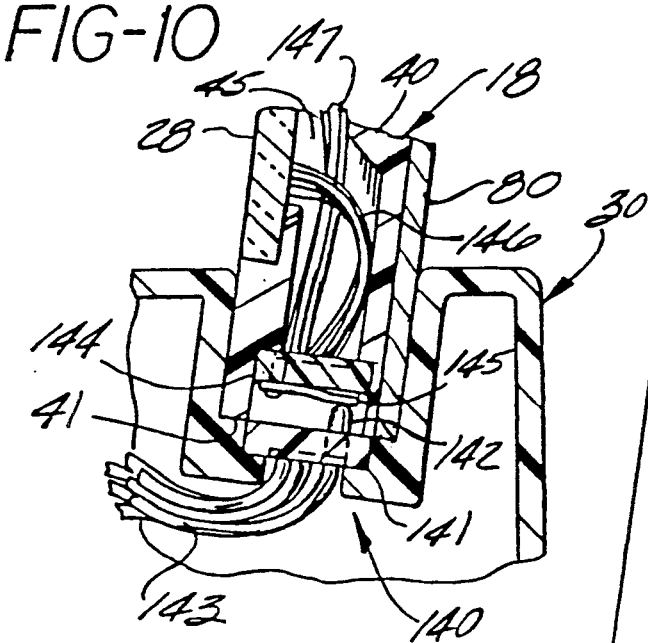
FIG. 10 is a cross-sectional view taken along line 10—10 of FIG. 2 showing a resiliently disengageable electrical connection means between the segmented display screen and the information processing device.
Figure 11:
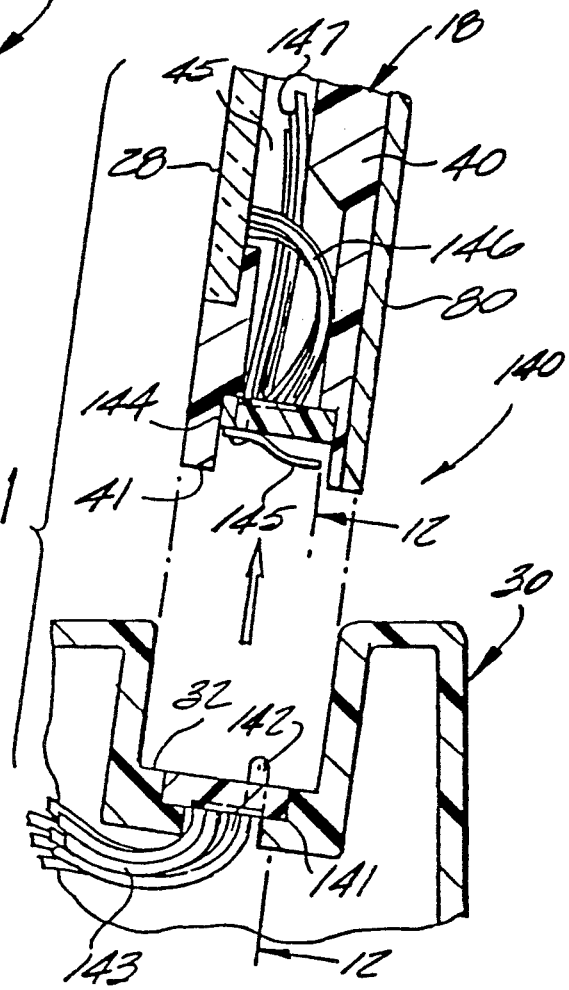
FIG. 11 is a view similar to FIG. 10 showing the electrical connections disengaged as the segmented display screen is displaced during removal from the information processing device.
Figure 12:
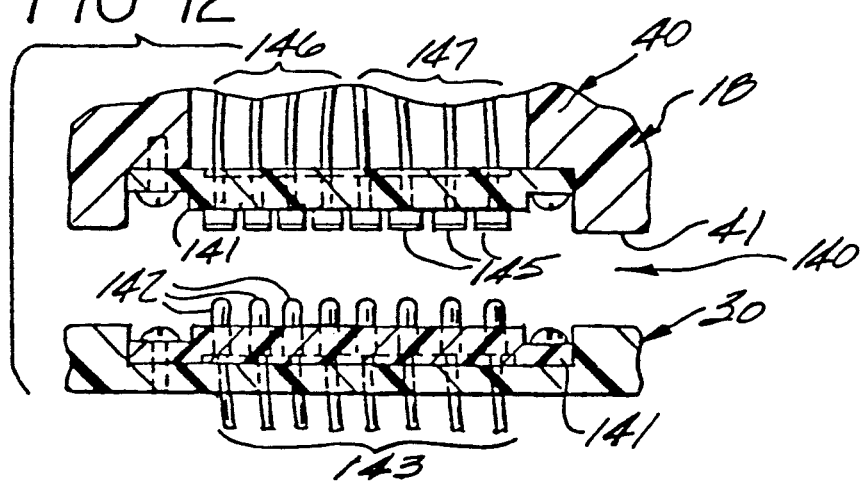
FIG. 12 is a cross-sectional view taken along line 12—12 of FIG. 11.

The resiliently disengageable second electrical connection means 140 shown in FIG. 2 which electrically connects the collapsibly segmented display screen 10 with the portable computer 30, will now be described, referring to FIGS. 10, 11, and 12. Pin terminal 141 is mounted at the bottom of slot 32 of the control module. It comprises contact pins 142 which are connected to electrical conductors 143, preferably wire ribbons, running from the computer itself. Leaf spring terminal 144 containing leaf spring connectors 145 is mounted within core 40 of segment 18. It is recessed within the bottom surface 41, in order to avoid potential damage when the screen is collapsed and the segments are disarranged or disassembled from the use array. Electrical conductors 146 and 147, preferably wire ribbons, run from the leaf spring connectors 145, respectively to the display means 28 and to the female terminal 91, particularly shown in FIG. 13. Wire access channels 45, molded into the cores 40 serve as a conduit for these electrical conductors.

Figure 16:
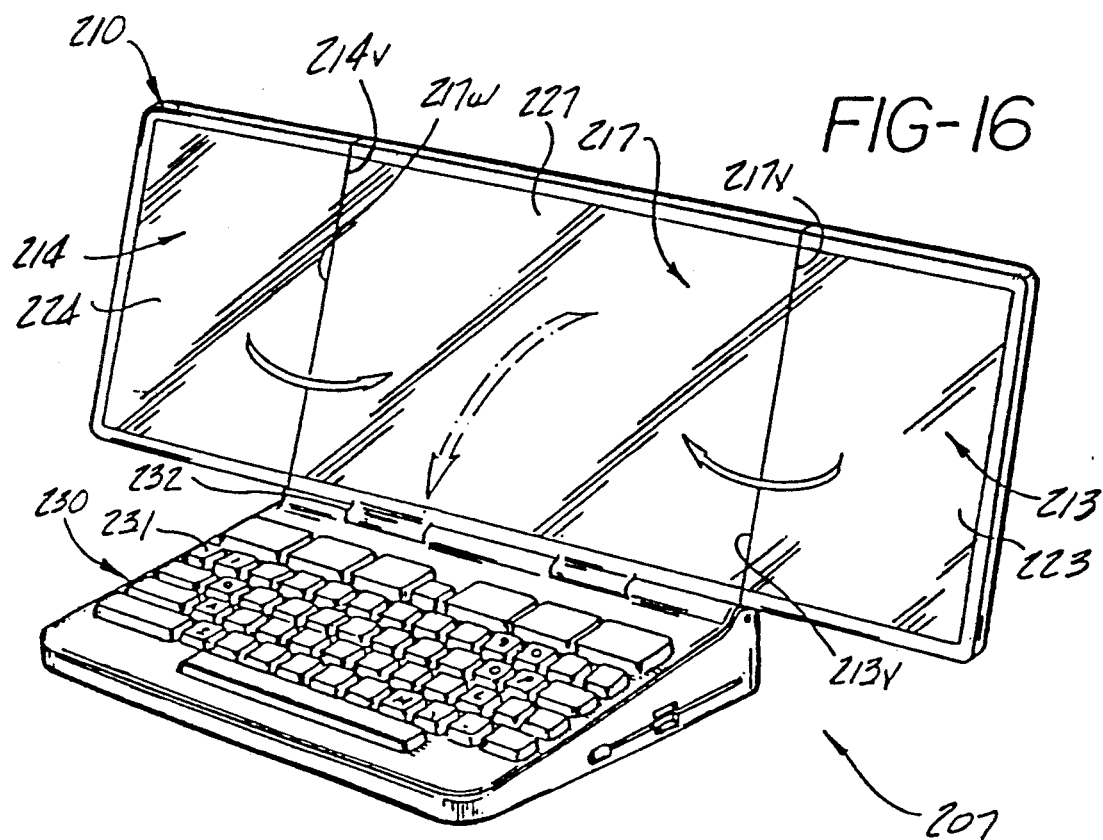
FIG. 16 is a front perspective view of a portable computer in another embodiment of the collapsible segmented display screen of the present invention; with the plurality of segments shown in the predetermined array, such array being disengageably mounted on the information processing device.
Figure 17:
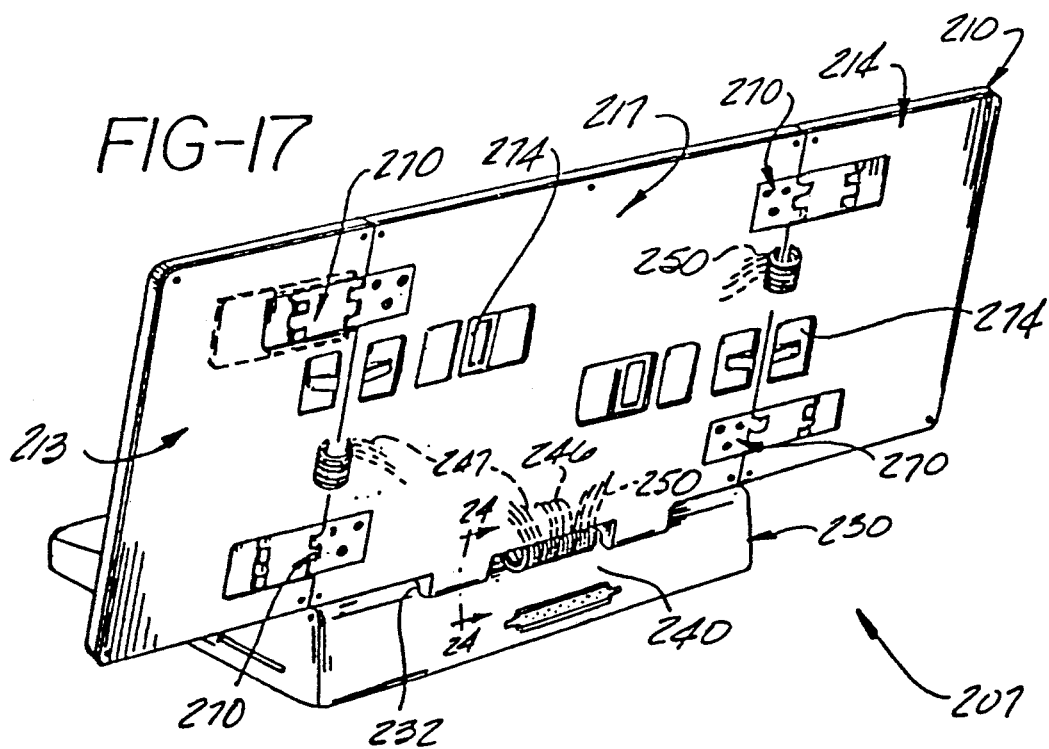
FIG. 17 is a rear perspective view of the same computer and screen shown in FIG. 16 showing mechanical and electrical connections between the center segment and two abuttingly adjacent wing segments.

FIGS. 16-24 all depict various aspects of another combination of a collapsibly segmented display screen of a portable computer or the like. Referring specifically to FIGS. 16 and 17, the combination 207 is comprised of an embodiment 210 of a collapsibly segmented, visual information display screen and a portable computer 230. The segmented display screen is nondisengageable from the computer and is shown with the segments in predetermined array for use. The segmented display screen is comprised of segments 213, 214 and 217. Each of these segments has a construction similar to the segments described in connection with FIGS. 1-15, having electronically actuatable information display means 223, 224, and 227 disposed respectively in the front of said segments. Each segment has a core 240 and backplate 280, shown in FIG. 19, which core, back and means combine to form the segment sides. The necessary mechanical and electrical connection means to permit the segments of the collapsibly segmented display screen to be arranged in predetermined array for use, and to permit the screen to be collapsed and the segments to be arranged in compact relation for storage area are also shown. Additionally shown are the mechanical and electrical connection means between the collapsibly segmented display screen 210 and the portable computer 230. For example, slide latches 274 shown in FIG. 17 are similar in construction and function to slide latches 74, previously described in connection with FIGS. 1-15. When engaged, the slide latches serve to lock wing segments 213 and 214 into their predetermined viewing array relative to lid segment 217. When disengaged, the slide latches permit the wing segments to be articulably moved each in relation to the other.

The collapsibly segmented display screen 210 is nondisengageably attached to the portable computer 230 by lid segment hinge 232, which permits articulation of the lid segment 217 between the positions of its predetermined use array and its position when the screen is collapsed and the segments are repositioned in compact relation to storage. The electrical continuity between portable computer 230 and the segmented display screen is provided by flexible electrical conductors 240, preferably a wire ribbon, which enters lid segment 217. Within the lid segment the flexible electrical conductors divide into three branches: 246, 247, and 250. Branch 246 terminates in display means 227, disposed in the front of lid segment 217. Branch 247 terminates in display means 223 disposed on the front of wing segment 213. Branch 250 terminates in display means 224, disposed on the front of wing segment 214. The flexible electrical conductors are provided with slack at the interfaces of the lid segment 217 with portable computer 230, as well as the interfaces with wing segment 213 and with wing segment 214. This slack is sufficient to accommodate for the articulated movement at these interfaces. Wire access channels molded into the cores 240, as shown in FIG. 19, serve as conduits for the electrical conductors, and are similar to those described in connection with FIGS. 1-15.

Wing segments 213 and 214 are nondisengageably attached to lid segment 217 by means of compound hinges 270. These compound hinges permit a frontward articulation of the wing segments as shown by the curved directional arrows in FIG. 16. With the segments shown assembled or arranged in their predetermined array for use, in FIG. 16, the compound hinges provide an abuttably adjoining condition between the adjacent sides 213v to 217v and 214v to 217v of display means 223, 224, and 227. Referring to FIG. 23, when articulated, the compound hinges permit the wing segments 213 and 214 to fold over and cover the display means 227 to lid segment 217 such that the display means 223 and 224 are facing display means 227. The forward articulation of wing segments 213 and 214 by compound hinges 270 will now be sequentially shown in FIGS. 18 through 23. FIGS. 18 and 19 show wing segment 213 and lid segment 217 in position in the predetermined array for use. Compound hinge 270 is non-disengageably mounted to wing segment 213 and to lid segment 217. Lid plate 273 of the compound hinge is rigidly attached to lid segment 217. Hinge plate 271 is slidably attached to wing segment 213. The hinge plate slides in guide groove 248 which is molded into core 240 of wing segment 213. The back plate 280 of wing segment 213 retains the hinge plate within the guide groove. Connecting plate 272 is articulably connected to both lid plate 273 and hinge plate 271. When the segments are arranged in predetermined use array, connecting plate 272 is also constrained within guide groove 248 and opening 281 of back plate 280. When slide latch 274, shown in FIG. 17, is unlatched, the wing segment 213 is free to move away from the lid segment 217 as indicated by the directional arrows in FIGS. 20 and 21. These Figures show compound hinge 270 in an intermediate position. Connecting plate 272 has moved out of guide groove 248 and opening 281. Hinge plate 271 has moved along within guide groove 248, but is restrained from further motion by hinge plate shoulder 274 stopping against guide groove shoulder 249. FIG. 22 shows compound hinge 270 in the next intermediate position where hinge plate 271 and segment 213 have articulated frontward 90 degrees relative to connecting plate 272, lid plate 273, and lid segment 217. FIG. 23 shows segmented display screen 210 in a collapsed condition, with the segments positioned in compact relation for transportation and storage. In this position connecting plate 272 of compound hinge 270 has articulated 90 degrees relative to lid plate 273 and lid segment 217, thus completing the frontward articulation of wing segment 213. Wing segment 213 is shown covering approximately half of display means 227 of lid segment 217. The above description of the closing sequence applies to all four compound hinges 270 shown in FIG. 17. In like manner wing segment 214 is shown covering the other half of display means 227 of lid segment 217.

FIG. 24 also shows segmented display screen 210 with wing segments 213 and 214 articulably moved into compact relation with lid segment 217, such as shown in FIG. 23. Stop surface 241 of lid segment 217 rests against projection 233 of portable computer 230, thus locating segmented display screen 210 at the proper angle for its predetermined use array. When lid segment hinge 232 is articulated forward, the collapsed segmented display screen, as shown in FIG. 23, is closed over the keyboard 231, thus placing such screen in position for storage and transport. Lid segment hinge 232 is frictional so that the segmented display screen is retained in whatever position it is placed by the user.

Figure 27:
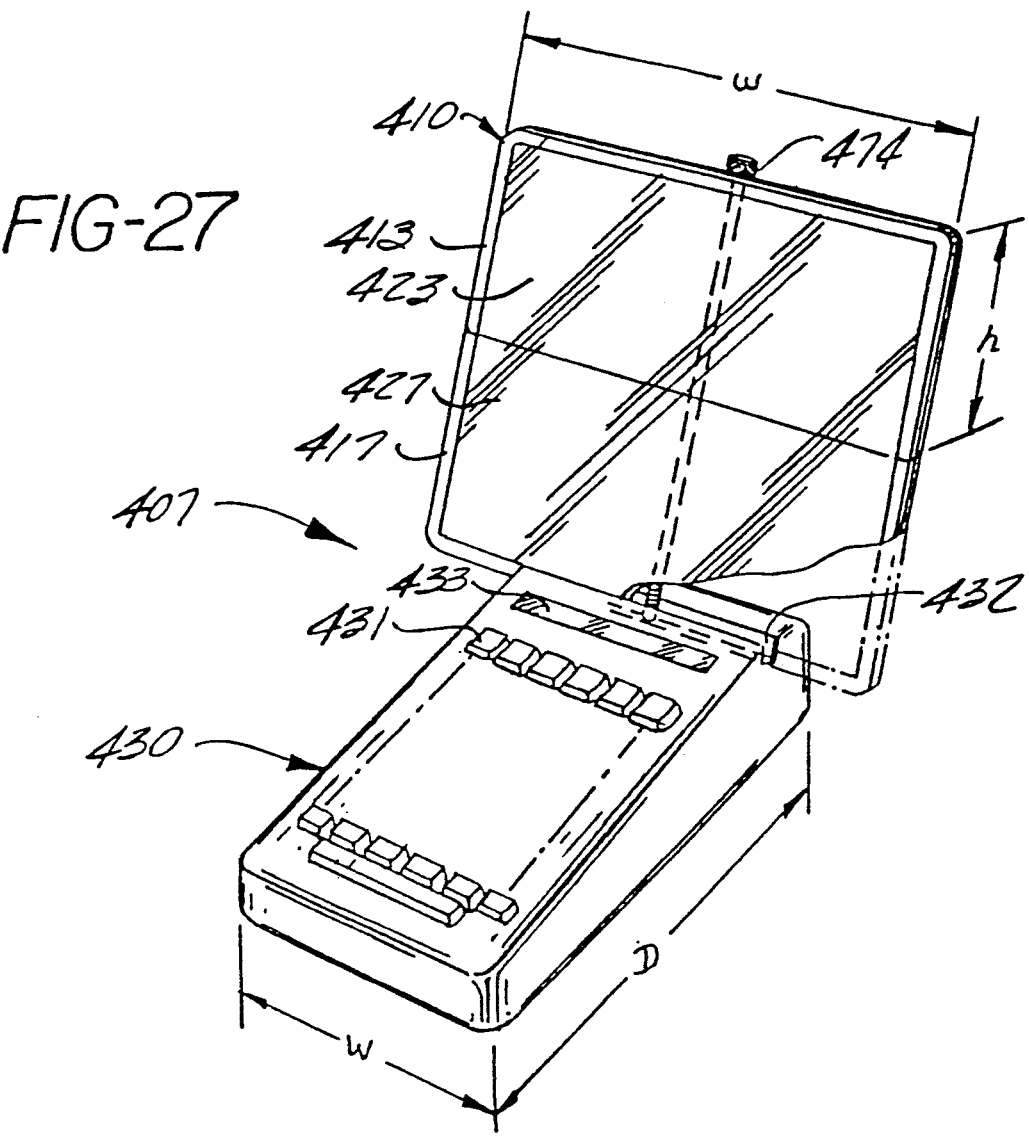
FIG. 27 is a perspective view of another embodiment of the present invention, showing a hand-held computer and disengageable segmented display screen.
Figure 28:
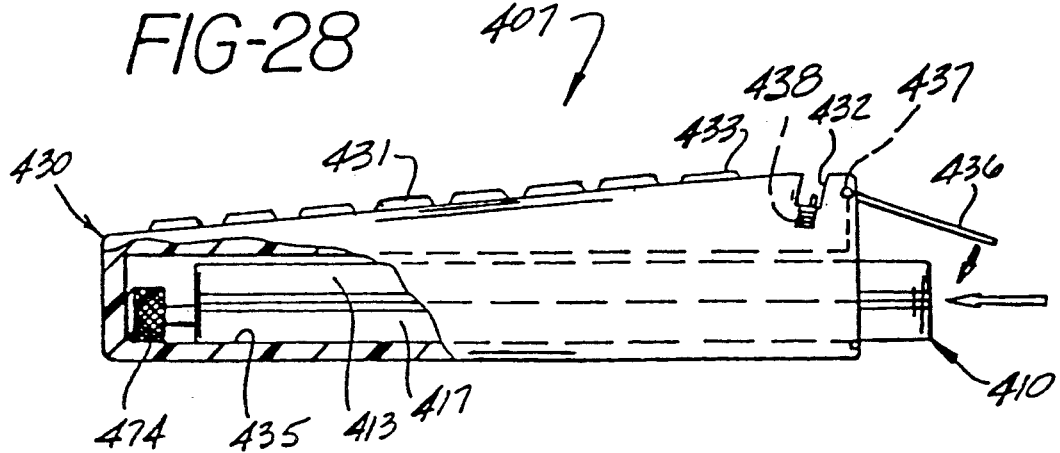
FIG. 28 is a side elevational view of the same computer and screen shown in FIG. 27 showing the display screen segments having been compactly arranged and slid into the storage compartment within the information processing device.

FIGS. 25 and 26 depict another combination 307 of a portable computer 330 or the like with another embodiment of a collapsibly segmented visual information display screen 310 of the present invention. Such screen is shown with its segments arranged in predetermined array use, and mounted on portable computer 330. The display screen comprises a plurality of segments having construction similar to the segments described earlier, comprising a display means 310, core and backplate, and the necessary mechanical and electrical interfacing components. The segmented display screen of this embodiment is non-disengageable. Segments 312 and 314 are nondisengageably attached with rearwardly articulating hinges 370, similar to hinges 70 described in FIG. 1. These hinges permit segments 312 and 314 to articulably move into compact relation with each other as shown in phantom in FIG. 4. Segments 314 and 316 are also nondisengageably attached with forwardly articulating compound hinges 377. These hinges 377 permit segments 314 and 316 to articulably move into compact relation with each other, functioning in a similar manner to hinges 270 described in FIGS. 16-24. When articulated into collapsed orientations, segments 312, 314 and 316 form a compact storage configuration. The storage configuration is pivoted by hinges 332 into the storage compartment 334 which is integral with the electronic information processing device 330. the compartment 334 may be lined with foam or felt to protect the segments. Support struts 374 support and retain the segmented display screen in its viewing mode and may be stored within the storage compartment. A storage compartment lid 336 is pivotably mounted around hinge pins 335 and may be in the closed position when the segmented display screen is 4 in either its viewing mode or its collapsed storage mode. The electrical continuity between the electronic information processing device 330 and the display segments is provided with flexible electrical conductors such as a wire ribbon 347, which preferably runs internally through the segments within channels molded into the cores of the segments, similar to those described in FIGS. 1-15. The electrical conductors are wired with enough slack to permit the required articulations between segments. FIGS. 27 and 28 show a portable computer or the like 407 depicted as a hand-held computer, having a segmented collapsible electronic data display screen 410. Segmented display screen 410 is shown mounted on electronic information processing device 430, in its predetermined viewing array. The display screen 410 is comprised of a multiplicity of segments similar to the segments described earlier, comprising a display means, core and backplate, and the necessary mechanical and electrical interfacing components. However, in this embodiment, the segments of the segmented display screen are fully disengageable from both the electronic information processing device 430 and from the other segments. Segment 417 is supportively constrained within slot 432 of electronic information processing device 430. Electrical connections between the display segment and the control module are similar to the resiliently disengageable electrical connection 140 described in FIGS. 1-15. Segment 413 and segment 417 also share electrical connections similar to the retractable electrical connection means 90 also described in FIGS. 2-3. Retaining screw 474, having a knurled head and threaded end, is placed through channels molded into the cores of segments 413 and 417 [similar to access channel 45 described in FIG. 4], and is screwed into threaded hole 438 located within the slot 432 of the electronic information processing device 430. The slot and retaining screw 474 provide mechanical support means for the segmented display screen in its assembled viewing array. The segments 413 and 417 are individually slidable into the storage compartment 435 which is integral with the information processing device 430, forming the collapsed storage array of this embodiment. The retaining screw 474 may be stored within the storage compartment 435. Lid 436 is pivotably mounted on hinge pin 437, providing closure for the storage compartment. Keyboard 431 may contain a secondary display screen 433, which can be used by itself or concurrently with the segmented display screen.

Figure 29:
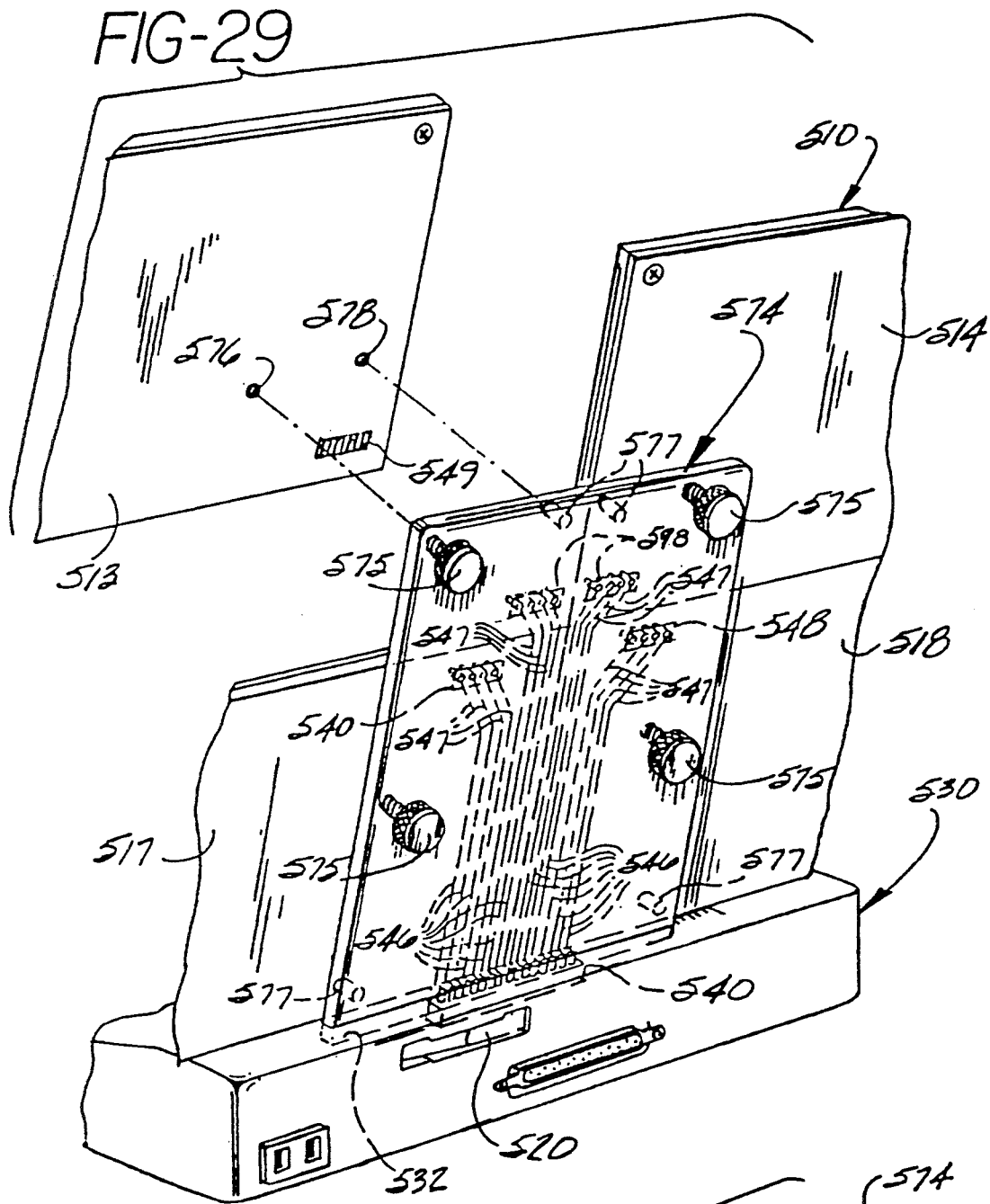
FIG. 29 is a partially exploded perspective view of another embodiment of a segmented display screen of the present invention having segments which are supportably and electrically connected to a supportive member rather than to each other.
Figure 29A:
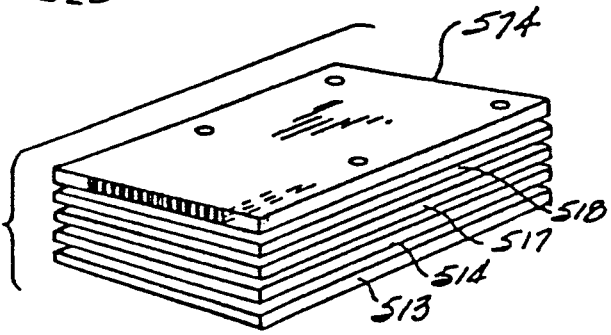
FIG. 29A is a perspective view of the segmented display screen segments and the external support means of FIG. 29, stacked in compact relation for storage.

FIGS. 29 and 29A depict yet another embodiment of the present invention. In this embodiment the display segments comprising the segmented display screen are abutable at their mating sides with the segments immediately adjoining them, as in all of the previously described embodiments. In this embodiment, segments 513, 514, 517 and 518 are mechanically and electrically engaged to and supported by each other through associated external support means 574. External support means 574 mechanically supports and retains the segments in their predetermined viewing array. In like manner the external support means 574 provides all the requisite electrical connections directly and individually to each segment.

In FIG. 29, segment 513 is shown exploded from the assembled segments. External support means 574 is supportedly constrained within slot 532 of the electronic information processing device 530. Pivoting latch assembly 520 locks the external support means into place within the slot. The pivoting latch assembly 520 is similar in construction and operation to the pivoting latch assembly 120 described in the embodiment of FIGS. 1-15. Locating pins 577 project from the external support means and are associated with loading holes 578 within the back of the segments. Removable thumb screws 575 project through holes in the internal support means and screw into threaded holes 576 in the segments, fastening the segments to the external support means. The locating pins 577 and the thumb screws 575, in combination with mating holes, serve to locate the segments in their predetermined viewing array on the external support means.

Resiliently disengageable electrical connection means 540 electrically connects the external support means 574 with the information processing device 530. The resiliently disengageable electrical connection means is similar in construction and operation to the resiliently disengageable electrical connection means 140 shown in FIG. 2. Electrical conductors 546 run from the resiliently disengageable electrical connection means 540 to external support means 574 dividing into four smaller groups of electrical conductors 547. Electrical conductors 547 terminate at contact pins of pin terminals 548. Electrical conductors 546 and 547 may be printed circuits or wire tapes or the like. When segments 513, 514, 517 and 518 are attached in their predetermined viewing array to external support means 574, the contact pins of pin terminals 548 are associated with corresponding leaf spring connectors of leaf spring terminals 549. Pin terminals 548 and leaf spring terminals 549 are similar to pin terminals 141 and spring terminals 144 described in FIG. 2. Electrical connectors from leaf spring terminals 549 connect with the display means of their respective segments as described in FIG. 2.

FIG. 29A shows the segments 513, 514, 517 and 518 and external support means 574, in their storage mode. The segments may be stored between layers of protective material such as felt, or within pouches of protective material.

FIGS. 30, 31, 32 and 32A show another type of segment assembly means in which a non-disengageable segment assembly 612 is comprised of segment 613 and 614. The segments are constructed generally as described earlier. This assembly is connected by a multiple bar linkage means 670 which provides means to articulate the segment assembly to and from the predetermined viewing array and the collapsed storage position. Short links 680 are pivotably connected to segments 613 and 614 by means of short link pins 681. Long links 671 and 672 are pivotably connected to the segments by means of long link pins 682. The other end of the long links are connected to each other by center pin 683.

Lock slide 673, when positioned around the center pin, retains the long links in linear alignment in the predetermined viewing array, as shown in FIGS. 30 and 31. When the lock slide is slid away from the center pin, the assembly is free to articulate to a back-to-back collapsed storage position with the display means 623 and 624 facing outward, as shown in FIG. 32.

FIGS. 33 and 34 show yet another type of segment assembly in which a disengageable coupling composed of a cam lock assembly 974 disengageably connects segments 913 and 917. These segments are constructed generally as described earlier. In FIG. 33, the cam plate 979 is shown in the disengaged position, retracted within a molded recess of the core of segment 913. The cam plate is pivotably associated with pin 985. Guide pin 977 connects the cam plate with the knob 975. The knob manually oscillates the cam plate between the disengaged and the engaged positions. Slot 981 in back plate 980 of segment 913 provides a path for the guide pin—when the cam plate is moved. The mating sides of segments 913 and 917, when proximate to each other, cause rotation of the cam plate by means of knob 975 toward the engaged position. The cam finger 976 exists from segment 913 and enters a recess in the core of segment 917. The camming surface 978 of the cam finger engages locking pin 982 mounted in segment 917. As the cam plate continues its motion, it cams the locking pin toward the pivot pin, thus drawing the side of segment 917 into abuttably adjoining contact with the mating side of segment 913. The electrical connectors used with this cam locking linkage would be similar to those described in FIGS. 1-15.

FIGS. 35, 36 and 37 depict other possible uses of segmented display screens which are not mounted on information processing devices. FIG. 35 shows a segmented display screen substantially identical to that described in FIGS. 1-15. The display screen is mounted within slot 932 of a base stand 930. Pivoting latch assemblies 920, similar to the pivoting latch assemblies described in FIGS. 1-15, retain the segmented display assembly within the slot. Resiliently disengageable electrical connections similar to those described in FIGS. 1-15 are used to electrically connect the segmented display screen with the base stand 930. Electrical signals to properly energize the display means of the segmented display screen are generated remotely and transmitted to the base stand through electrical conductors 937, and then to the display means, through the conductors and disengageable connectors previously described. FIG. 36 is similar to FIG. 35 except a pin terminal bar 941 replaces the base stand 930. The pin terminal bar supplies the required electrical connections for the segmented display screen but it provides no mechanical support. The mechanical support for the segmented display screen would be externally provided, for example, by hanging it on a wall hook (not shown). FIG. 37 shows a larger audience sized segmented display screen 710 in its predetermined viewing array. This screen is also collapsible to a compact storage size. It is shown mounted on a floor stand 730, although any type of secure mounting will suffice. A pin terminal bar 732 similar to pin terminal bar 941 of FIG. 36, but including mechanical support, supplies the required electrical connections, the signals being generated remotely and fed in through electrical conductors 746, from a remote source.

Figure 38:
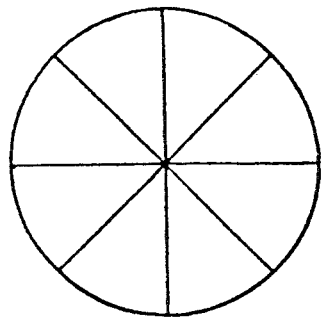
FIGS. 38 through 45 depict various alternate patterns for segmenting visual information display screens according to the present invention.
Figure 39:
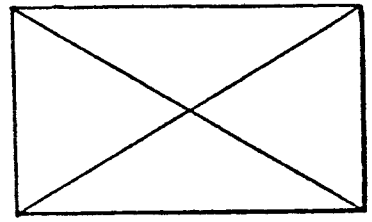
Figure 40:
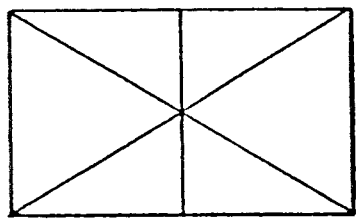
Figure 41:
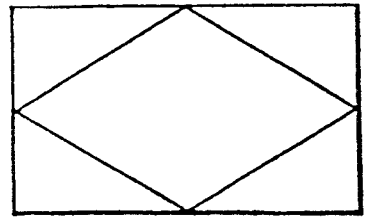
Figure 42:
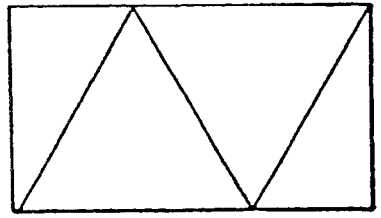
Figure 43:
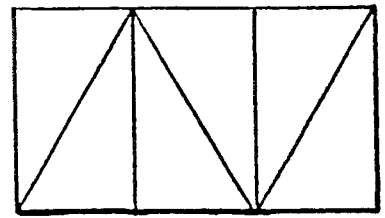
Figure 44:
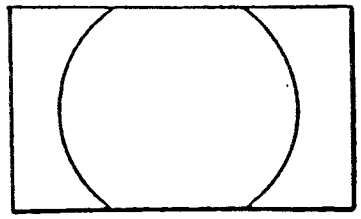
Figure 45:
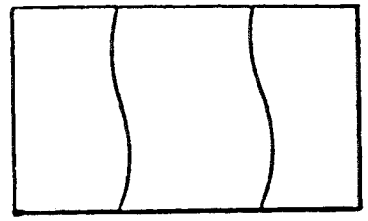

FIGS. 38-45 show some alternate patterns for segmenting electronic data display screens according to the present invention. FIG. 38 shows a circular display screen segmented into pie-shaped wedges. FIG. 39 shows a rectangular display screen divided into triangulated segments by dividing lines running to diagonally opposite corners. FIG. 40 repeats FIG. 39 with the addition of a vertical dividing line, bisecting the horizontal sides of the display screen. FIG. 41 interposes a diamond shaped division within the rectangular display screen. FIG. 42 segments the rectangular display screen with a zig-zag dividing pattern forming two isosceles triangle segments and two right triangular segments. FIG. 43 adds two vertical dividing lines intersecting the apexes of the isosceles triangles of FIG. 42, forming six identical right triangular segments. FIG. 44 divides the rectangular display screen into three segments with two arcuate dividing lines, concavely facing each other. FIG. 45 again divides the rectangular display screen into three segments with two "S" shaped dividing lines. The segmented display screen patterns shown in the preferred embodiments and in FIGS. 38-45 are only an indication of the wide array of patterns of segmented display screens included within the scope of this invention.

FIGS. 46 and 47 depict a segmented display screen scroll assembly 807 of the present invention. The segmented display screen scroll 810 is a series of nondisengageable segments which can be stored in a rolled up orientation, rather than the stacked orientations shown in previous embodiments for both disengageable and nondisengageable segments. FIG. 46 shows the segmented display screen in its predetermined viewing array. Segments 812, 813, 814, 815, 816, and 817 are articulated together in a chain-like fashion, by hinges 832, 833, 834, 835, and 836 and stored on the chordal roller 850. The chordal roller may be self-retracting by being torsionally sprung. It comprises chordal flats 852 which locate against the backs of the segments, recesses 853 provide clearance for the required flexible electrical conductors, preferably a wire ribbon. An axial hole 851 serves as an inlet for the wire ribbon emanating from a signal source such as a control module (not shown). Anchor hinge 837 connects the bottom end of segment 817 with the chordal roller. An access opening between the axial hole and the chord adjacent to segment 817 provides a passageway for the wire ribbon from the axial hole to segment 817. The requisite number of wires from the wire ribbon enter segment 817 and connect with display means 827. The remainder of the wire ribbon continues to segment 816 where again the requisite number of wires enter segment 816 and connect with display means 826. In similar manner the requisite number of wires from ribbon 846 are connected with each of display means 822, 823, 824, and 825. FIG. 47 shows the segmented display screen scroll assembly being unwound from its storage position to its viewing array. A hook 811, attached to segment 812, hooks onto a rigid support means (not shown) to retain the segmented display screen scroll in its predetermined viewing array.

Figure 48:
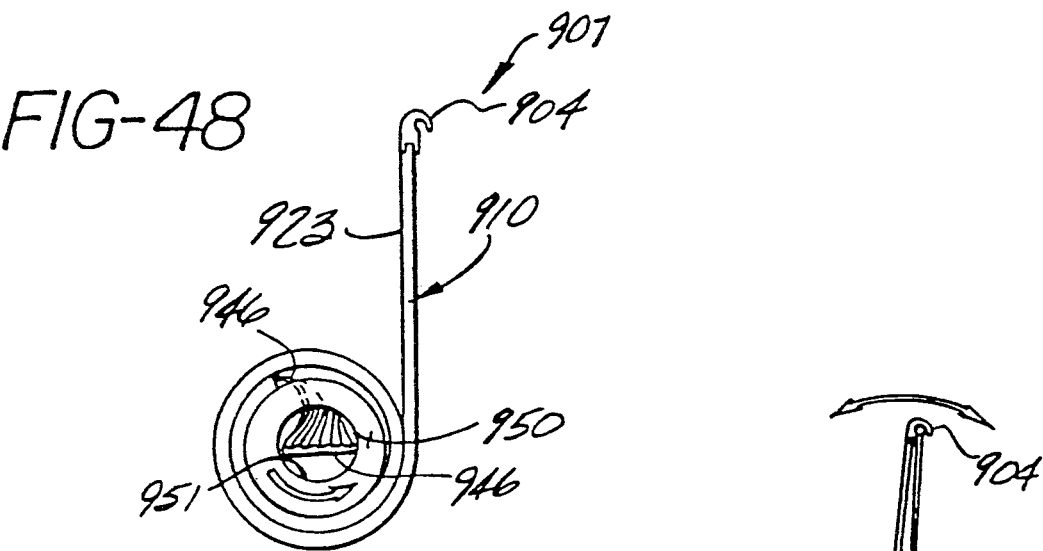
FIG. 48 is a schematic mechanical representation of a flexible electronic data display screen stored in a scroll configuration.
Figure 49:
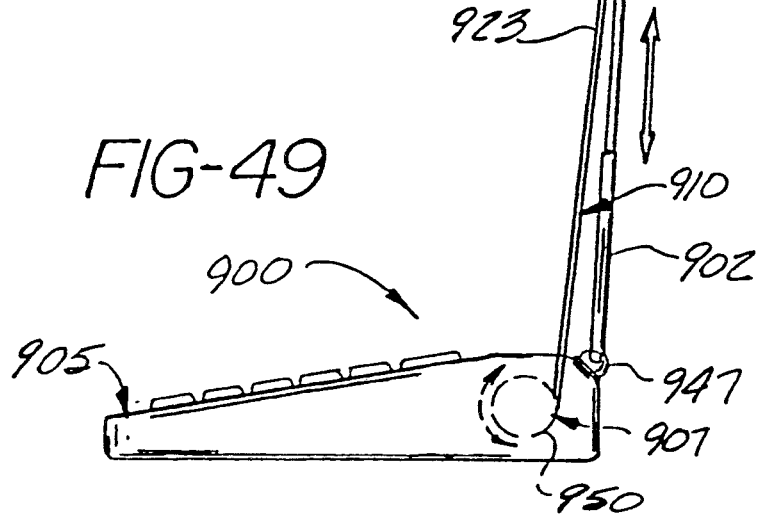
FIG. 49 is a side elevational view of a portable computer utilizing the flexible display screen of FIG. 48 shown in use in its predetermined array orientation.
Figure 50:
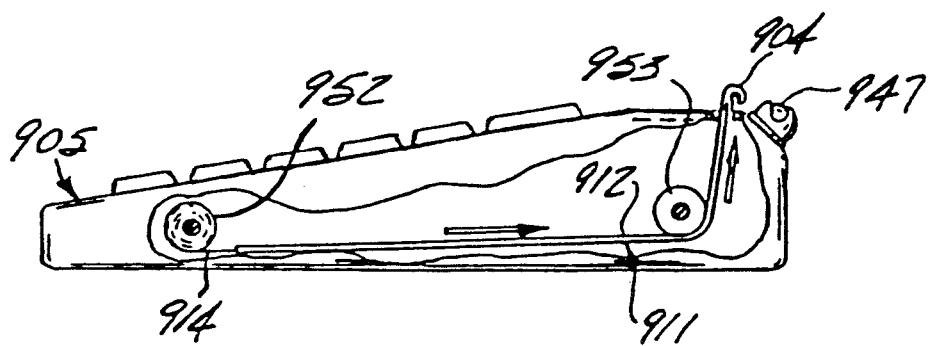
FIG. 50 is a side elevation of a portable computer with a flexible display screen stored in a linear rather than a scroll configuration.

FIGS. 48, 49, and 50 depict a flexible electronic data display screen scroll assembly 907, which is a variation of the segmented display screen scroll 810 shown in FIGS. 46 and 47. Referring to FIG. 48, the flexible display screen 910 containing display surface 923 is spirally wrapped around storage roller 950. The storage roller is self retracting, being torsionally sprung. The display surface 923 is shown wrapped to the inside of the spiral, but it could also be wrapped to the outside of the spiral. The inner end of the flexible display screen is attached to the storage roller, and flexible electrical conductors 946 emanating from a signal source (not shown), feed into the axial hole 951, and from there through a passageway to connect with the inner end of the flexible display screen. FIG. 49 shows scroll assembly 907 in its predetermined viewing orientation, schematically combined with a control module 903 to form a portable computer 900. Hook 904, attached to flexible display screen 910, hooks onto telescoping support struts 902, thus retaining the flexible display screen in its predetermined viewing orientation. The struts are rigidly constrained by strut mount 947. When the hooks of the flexible display screen are released from the telescoping support struts, the flexible display screen spirally rolls up on the storage roller 950. FIG. 50 depicts another storage variation of the flexible display screen. In this variation the flexible display screen 911 is stored within control module 905 in a more linear orientation, partially wrapped around one or more idler rollers 953. Torsionally sprung roller 952 supplies the retracting force through flexible tensile member 914. This tensile member may be the wire ribbon which conducts the requisite electrical signals to the flexible display screen. The wire ribbon is routed through the torsionally sprung roller in similar manner to that described for storage roller 950.

FIGS. 51 and 52 depict a portable computer 747 including a flexible electronic data display screen scroll assembly 749 of the present invention. The flexible display screen 762 of assembly 749, when in its predetermined viewing orientation, is horizontally stretched between the vertically oriented screen canister 760 and the vertically oriented draw rod 764. The screen canister is supported by the canister outrigger 752. The draw rod is supported by the draw rod outrigger 754. The screen in wrapped around the curved back surface of the electronic processing device 750, thus providing a concavely curved display surface 763. When collapsed, the flexible display screen is retracted into the screen canister 760, through slot 761. When the flexible display screen is in its retracted storage orientation, it is spirally wrapped around storage roller 766, with the display surface 763 to the outside of the spiral. When retracted, only the draw rod 764 projects from the canister. The storage roller is centrally supported within the screen canister, and is self retracting, being torsionally sprung. In similar manner to the embodiment illustrated in FIGS. 46, 47, and 48, the inner end of the flexible display screen is attached to the storage roller, which contains an axial hole through which flexible electrical conductors originating from the control module 750 are connected with the flexible display screen. When collapsed into the storage mode, the canister, with the flexible display screen spirally wrapped up inside it, is stored in hole 751, provided within the control module 750. The canister outrigger 752 is pivotably mounted about pivot pin 753 and stored in storage recess 756. In similar manner, the draw rod outrigger 754 is pivotably mounted about pivot pin 755, and stored in storage recess 757.

While the drawings and specification have described the invention with reference to portable computers, it will be understood by those skilled in the art that the invention may have applications with stationary type computers as well.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. In combination, a portable computer and an associated visual information display screen adapted to be easily collapsible for storage and transportation wherein:

said portable computer is of the type adapted to be hand carried by the user for operation in temporary locations, and to supply information bearing electronic signals for generating a visual display on said screen, and having electrical connection means adapted to supply substantially all of said information-bearing electronic signals to said visual information display screen;

said display screen is adapted to receive said information-bearing electronic signals from said portable computer and to visually display said information born by said signals;

said screen further comprising:

a plurality of segments, each having a back, a front and at least three sides and each adapted to be abuttably disposed adjacent at least one other segment in side-to-side relation;

electronically actuatable visual information display means carried by each said segment and disposed on the front thereof;

first electrical connection means associated with each said segment for conductively connecting said segment to at least one other segment;

second electrical connection means associated with at least one said segment for conductively cooperating with said electrical connection means of said portable computer;

first mechanical connection means associated with each said segment for supportably connecting said segment to at least one other segment;

second mechanical connection means associated with one or more of said segments for supportably connecting all of said segments to said portable computer;

said first electrical connection means and said first mechanical connection means each being so constructed that said plurality of segments may when in use in association with said portable computer be interconnectably and supportably arranged in a predetermined array and may when not in use be disarranged from said array and rearranged in compact relation for storage and transportation;

whereby said screen is adapted for attachment to and portable use with said portable computer.

2. A combination as in claim 1, wherein said portable portable computer further comprises means for receiving and storing said plurality of segments when said plurality is not in use and has been rearranged in said compact relation.

3. A combination as in claim 1, wherein said first electrical connection means is so constructed as to disengageably connect said segment to at least one other segment.

4. A combination as in claim 1 wherein said first electrical connection means is so constructed as to articulably connect said segment to at least one other segment.

5. A combination as in claim 1, wherein said first mechanical connection means is so constructed as to disengageably connect said segment to at least one other segment.

6. A combination as in claim 1, wherein said first mechanical connection means is so constructed as to articulably connect said segment to at least one other said segment.

7. A combination as in claim 1, wherein said first electrical connection means is carried by the back of said segment.

8. A combination as in claim 1, wherein said first electrical connection means is carried by at least one side of said segment.

9. A combination as in claim 1, wherein said first mechanical connection means is carried by the back of said segment.

10. A combination as in claim 1, wherein said first mechanical connection means is carried by at least one side of said segment.

11. A combination as in claim 1, wherein at least one segment of said plurality has four sides arranged rectangularly.

12. A combination as in claim 1, wherein at least one segment of said plurality has three sides, of which at least two are rectilinear.

* * * * *